(12) United States Patent
Itonaga et al.

(10) Patent No.: US 12,054,971 B2
(45) Date of Patent: Aug. 6, 2024

(54) COVER DEVICE

(71) Applicant: AISIN CORPORATION, Kariya (JP)

(72) Inventors: Hisashi Itonaga, Kariya (JP);
Tomohito Kiryu, Kariya (JP);
Toshimitsu Morioka, Kariya (JP);
Koichi Morita, Kariya (JP)

(73) Assignee: AISIN CORPORATION, Kariya (JP)

( * ) Notice: Subject to any disclaimer, the term of this patent is extended or adjusted under 35 U.S.C. 154(b) by 323 days.

(21) Appl. No.: 17/648,429

(22) Filed: Jan. 20, 2022

(65) Prior Publication Data

US 2022/0243502 A1    Aug. 4, 2022

(30) Foreign Application Priority Data

Feb. 3, 2021    (JP) .................. 2021-015782

(51) Int. Cl.
| | |
|---|---|
| E05B 81/16 | (2014.01) |
| B60J 5/04 | (2006.01) |
| B60J 5/06 | (2006.01) |
| E05B 63/14 | (2006.01) |
| E05B 81/06 | (2014.01) |
| E05B 81/18 | (2014.01) |
| E05B 81/32 | (2014.01) |
| E05B 83/40 | (2014.01) |
| E05B 85/04 | (2014.01) |

(52) U.S. Cl.
CPC ............... E05B 81/16 (2013.01); B60J 5/047 (2013.01); B60J 5/0477 (2013.01); B60J 5/06 (2013.01); E05B 63/143 (2013.01); E05B 81/06 (2013.01); E05B 81/18 (2013.01); E05B 81/32 (2013.01); E05B 83/40 (2013.01); E05B 85/045 (2013.01); B60J 2005/0475 (2013.01)

(58) Field of Classification Search
USPC ....................................... 296/155; 292/341.14
See application file for complete search history.

(56) References Cited

U.S. PATENT DOCUMENTS

| | | | |
|---|---|---|---|
| 8,246,088 B2 * | 8/2012 | Stechschulte | E05B 77/00 292/341.15 |
| 9,556,648 B2 * | 1/2017 | Gardner | E05F 15/73 |
| 11,572,726 B2 * | 2/2023 | Choi | E05B 85/243 |
| 2013/0038075 A1 * | 2/2013 | Wilde | E05B 81/00 292/341.14 |
| 2021/0180370 A1 | 6/2021 | Oda et al. | |

FOREIGN PATENT DOCUMENTS

| | | |
|---|---|---|
| JP | 2005-88812 A | 4/2005 |
| JP | 2021-95706 A | 6/2021 |
| KR | 10-0858192    * | 9/2008 |

* cited by examiner

*Primary Examiner* — Joseph D. Pape
(74) *Attorney, Agent, or Firm* — Oblon, McClelland, Maier & Neustadt, L.L.P.

(57) ABSTRACT

A cover device includes a cover that is displaced between a covering position where an upper side of a striker is covered, and an exposure position where the striker is exposed upward, and an open-close mechanism that displaces the cover to the covering position when a slide door performs an opening operation, and displaces the cover to the exposure position when the slide door performs a closing operation.

4 Claims, 21 Drawing Sheets

COVER DEVICE

CROSS REFERENCE TO RELATED APPLICATIONS

This application is based on and claims priority under 35 U.S.C. § 119 to Japanese Patent Application 2021-015782, filed on Feb. 3, 2021, the entire content of which is incorporated herein by reference.

TECHNICAL FIELD

This disclosure generally relates to a cover device.

BACKGROUND DISCUSSION

JP2005-88812A (Reference 1) describes a vehicle including a vehicle body in which a door opening is formed in a side portion, and a front slide door and a rear slide door that open and close the door opening. The front slide door opens a front half of the door opening by sliding frontward, and the rear slide door opens a rear half of the door opening by sliding rearward.

Since a vehicle including a double slide door as described above does not include a center pillar, a component (hereinafter, also referred to as a "door lock component") for binding a slide door to a full closed position, such as a striker, may not be placed in the center pillar. That is to say, in a vehicle as described above, a need arises to arrange a door lock component at a lower end portion of the door opening. However, it is preferable that getting on and off a vehicle by a user does not affect such a door lock component.

A need thus exists for a cover device which is not susceptible to the drawback mentioned above.

SUMMARY

A cover device that solves the problem described above is applied to a vehicle including a vehicle body having a door opening, and a vehicle door that opens and closes the door opening. The vehicle body includes a door lock component that is placed in a bottom portion of the door opening and is coupled to the vehicle door, and thereby binds the vehicle door at a full closed position. The cover device includes a cover and an open-close mechanism. The cover is displaced between a covering position where an upper side of the door lock component is covered, and an exposure position where the door lock component is exposed upward. The open-close mechanism displaces the cover to the covering position when the vehicle door performs an opening operation, and displaces the cover to the exposure position when the vehicle door performs a closing operation.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, one embodiment of a vehicle including a cover device is described. In the following description, an axis extending in a vehicle width direction is an X-axis, an axis extending in a front-rear direction is a Y-axis, and an axis extending in a vehicle up-down direction is a Z-axis. Moreover, in the following description, the "vehicle width direction, vehicle front-rear direction, and vehicle up-down direction" are also referred to as a "width direction, front-rear direction, and up-down direction", respectively.

<Vehicle 10>

Figure 1:
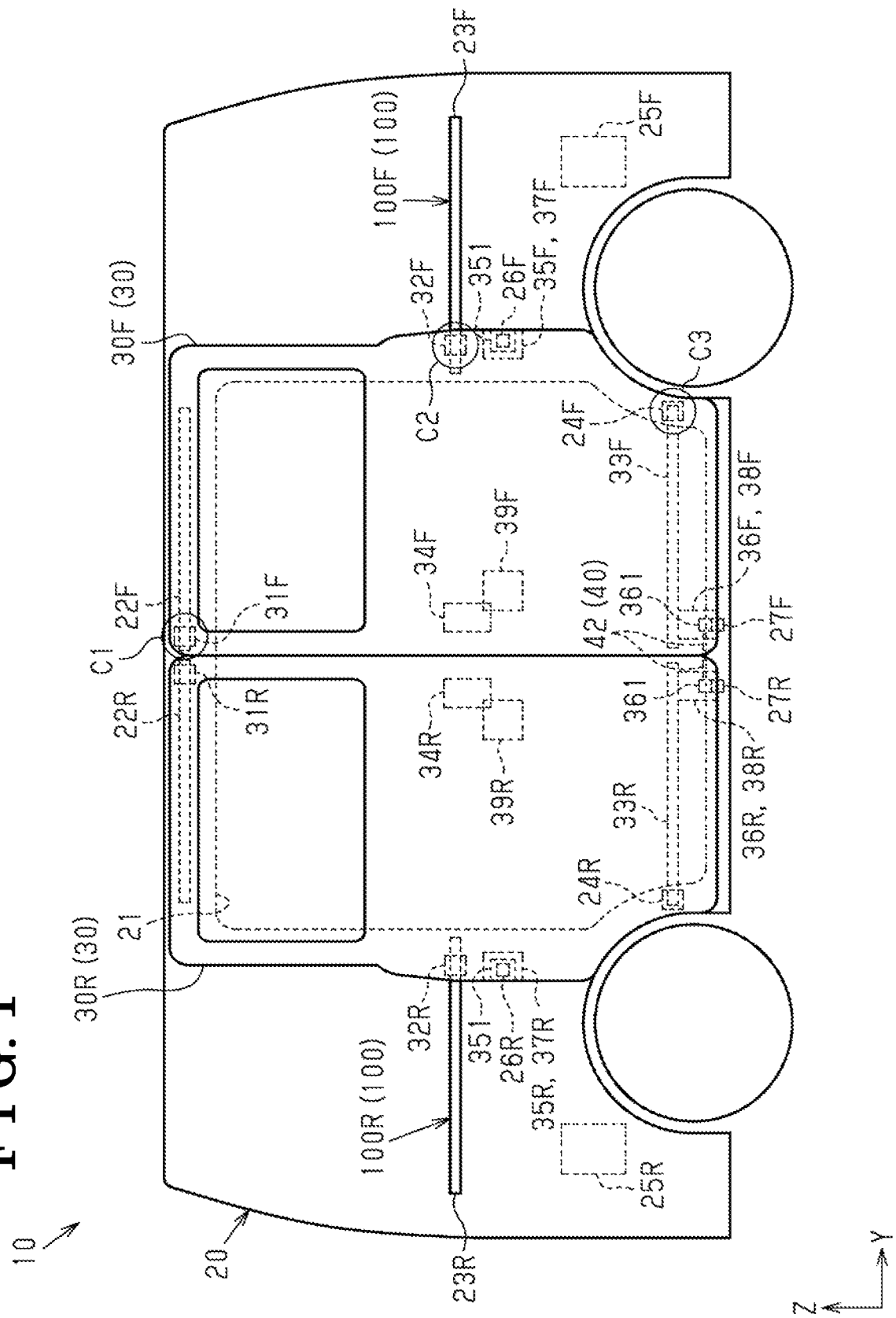
FIG. 1 is a schematic view of a vehicle including a cover device according to one embodiment.

As illustrated in FIG. 1, a vehicle 10 includes a vehicle body 20, a slide door 30 (30F and 30R), and a cover device 40.

<Vehicle Body 20>

As illustrated in FIG. 1, the vehicle body 20 includes a door opening 21, upper rails 22F and 22R, center rails 23F and 23R, lower hinge units 24F and 24R, door drive units 25F and 25R, a front striker 26F and a rear striker 26R, and lower strikers 27F and 27R. As illustrated in FIG. 1, components of the vehicle body 20 are symmetrically arranged on front and rear sides with reference to the center of the front-rear direction of the door opening 21.

As illustrated in FIG. 1, the upper rail 22F is arranged above the door opening 21. That is to say, the upper rail 22F is arranged above the center rail 23F and the lower hinge unit 24F. The upper rail 22F has a substantially constant sectional shape in a longitudinal direction.

Figure 2:
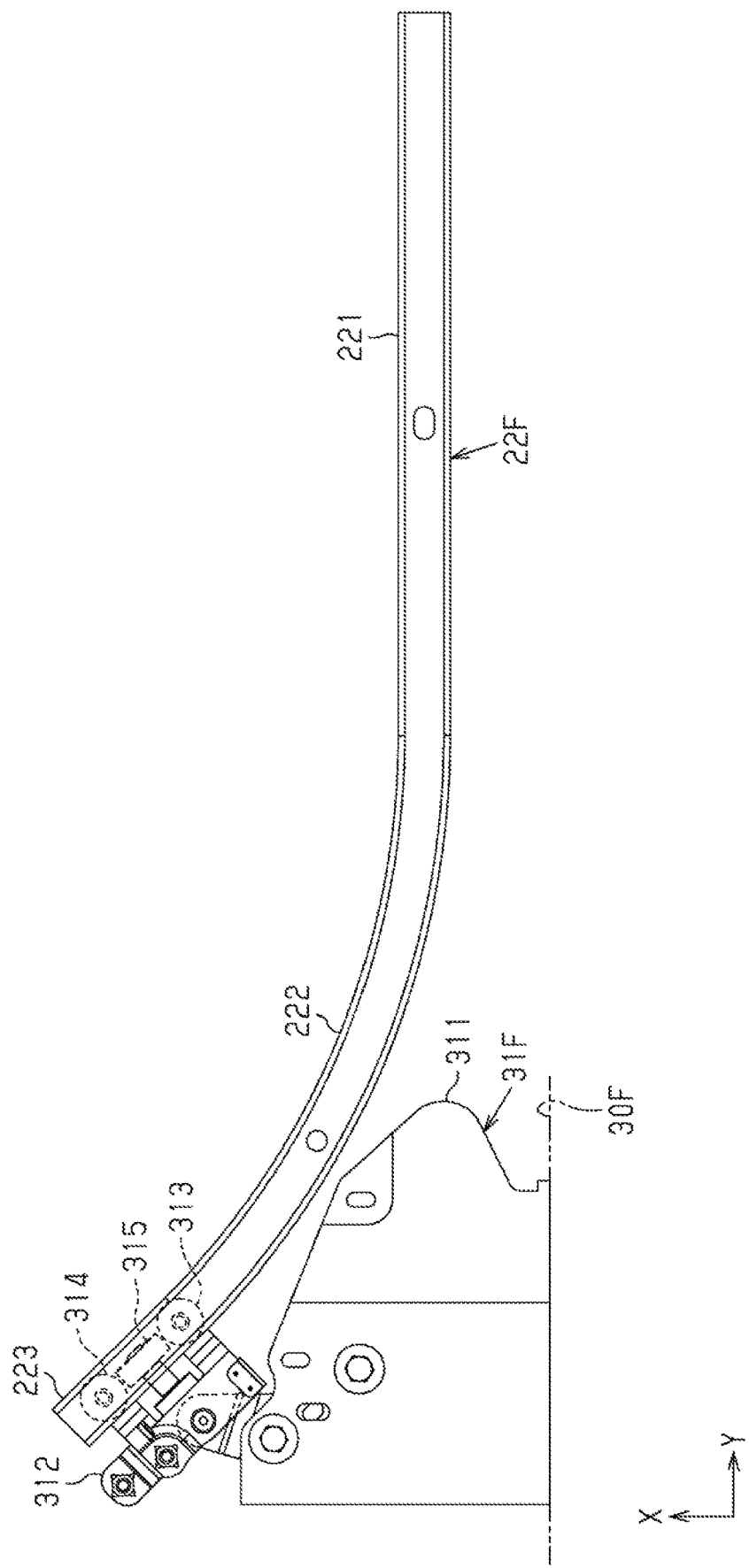
FIG. 2 is a plan view of an upper rail and an upper hinge unit.

As illustrated in FIG. 2, the upper rail 22F includes a rearwardly and linearly extending first upper rail 221, a second upper rail 222 extending in an arc shape inward in a width direction as it moves rearward from a rear end of the first upper rail 221, and a third upper rail 223 linearly extending from a tip of the second upper rail 222. That is to say, a part of the upper rail 22F constituting the second upper rail 222 is curved. The first upper rail 221 is slightly longer than the second upper rail 222. The first upper rail 221 and the second upper rail 222 are longer than the third upper rail 223. Note that a rear side in the upper rail 22F is associated with an opening direction of the slide door 30F supported by the upper rail 22F.

As illustrated in FIG. 1, the center rail 23F is arranged in front of the door opening 21, and between the upper rail 22F and the lower hinge unit 24F in an up-down direction. The center rail 23F has a substantially constant sectional shape in a longitudinal direction.

Figure 3:
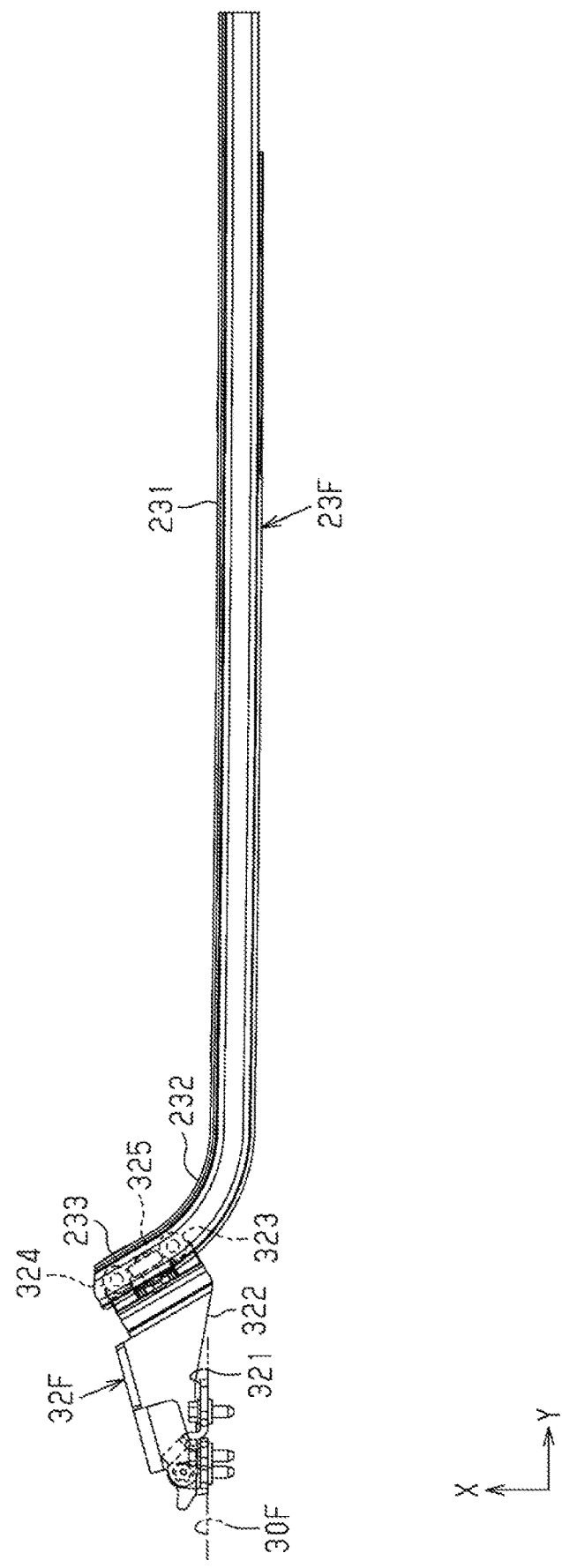
FIG. 3 is a plan view of a center rail and a center hinge unit.

As illustrated in FIG. 3, the center rail 23F includes a rearwardly and linearly extending first center rail 231, a second center rail 232 extending in an arc shape inward in a width direction as it moves rearward from a rear end of the first center rail 231, and a third center rail 233 linearly extending from a tip of the second center rail 232. That is to say, a part of the center rail 23F constituting the second center rail 232 is curved. The first center rail 231 is longer than the second center rail 232 and the third center rail 233. The lengths of the second center rail 232 and the third center rail 233 are substantially equal. As illustrated in FIGS. 2 and 3, a curvature radius of the second center rail 232 is smaller than a curvature radius of the second upper rail 222, and a length of the second center rail 232 is shorter than a length of the second upper rail 222. Note that a rear in the center rail 23F is associated with an opening direction of the slide door 30F supported by the center rail 23F.

Figure 4:
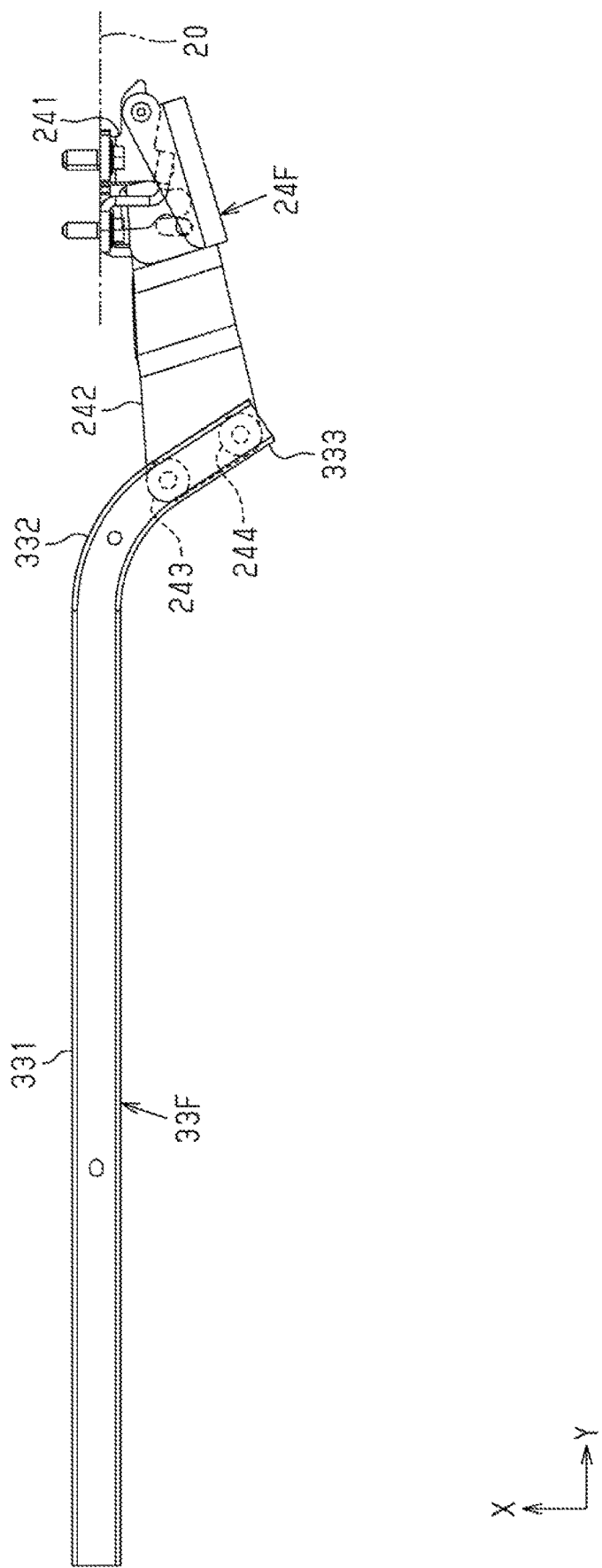
FIG. 4 is a plan view of a lower rail and a lower hinge unit.

As illustrated in FIG. 1, the lower hinge unit 24F is arranged at a position close to a lower end of the door opening 21, and close to a rear end of the door opening 21. As illustrated in FIG. 4, the lower hinge unit 24F includes a fixed hinge 241, a movable hinge 242, a first guide roller 243, and a second guide roller 244.

The fixed hinge 241 is fixed to the vehicle body 20. A proximal end of the movable hinge 242 is rotatably supported by the fixed hinge 241, and a distal end of the movable hinge 242 rotatably supports the first guide roller 243 and the second guide roller 244. A rotation axis of the movable hinge 242 and rotation axes of the first guide roller 243 and the second guide roller 244 extend in an up-down direction.

Note that the upper rail 22R, the center rail 23R, and the lower hinge unit 24R each have a shape symmetrical to the upper rail 22F, the center rail 23F, and the lower hinge unit 24F with respect to a plane orthogonal to a front-rear direction. Thus, description of the upper rail 22R, the center rail 23R, and the lower hinge unit 24R is omitted.

The door drive units 25F and 25R drive the slide doors 30F and 30R, respectively. The door drive units 25F and 25R are each configured, for example, by including a motor, and a transmission mechanism that transmits power of the motor to each of the slide doors 30F and 30R. The transmission mechanism of each of the door drive units 25F and 25R can be configured by including a pulley and a belt, or can be configured by including a drum and a cable.

As illustrated in FIG. 1, the front striker 26F is located in front of the door opening 21, and the rear striker 26R is located in rear of the door opening 21. The lower strikers 27F and 27R are each located at a lower end of the door opening 21, and in a center of the door opening 21 in a front-rear direction. The lower strikers 27F and 27R are located with a slight gap in between in a front-rear direction. In this embodiment, the lower strikers 27F and 27R are equivalent to one example of a "door lock component".

<Slide Door 30>

As illustrated in FIG. 1, the slide door 30 includes the slide doors 30F and 30R that open and close the door opening 21. The slide door 30 is equivalent to one example of a "vehicle door".

The slide door 30F opens and closes a front-half range of the door opening 21, and the slide door 30R opens and closes a rear-half range of the door opening 21. A position where each of the slide doors 30F and 30R fully opens the door opening 21 is referred to as a "full opening position", and a position where each of the slide doors 30F and 30R fully closes the door opening 21 is referred to as a "full closed position".

The slide doors 30F and 30R are power slide doors that perform an opening-closing operation between the full opening position and the full closed position by the door drive units 25F and 25R. The slide door 30F performs an opening operation by moving frontward, and performs a closing operation by moving rearward. On the other hand, the slide door 30R performs an opening operation by moving rearward, and performs a closing operation by moving frontward. That is to say, the slide doors 30F and 30R performs an opening operation by moving in directions away from each other, and performs a closing operation by moving in directions approaching each other.

A moving direction, along a front-rear direction, when the slide door 30 performs an opening operation is referred to as an "opening direction of the slide door 30". On the other hand, a moving direction, along a front-rear direction, when the slide door 30 performs a closing operation is referred to as a "closing direction of the slide door 30". That is to say, an opening direction and a closing direction differ depending on the slide doors 30F and 30R.

<Slide Door 30F>

As illustrated in FIG. 1, the slide door 30F includes an upper hinge unit 31F, a center hinge unit 32F, a lower rail 33F, a door handle 34F, a front lock device 35F, a lower lock device 36F, a front lock drive device 37F, a lower lock drive device 38F, and a remote controller 39F.

As illustrated in FIG. 1, the upper hinge unit 31F is arranged at a position close to a front end of the slide door 30F, and close to an upper end thereof. As illustrated in FIG. 2, the upper hinge unit 31F includes a fixed hinge 311, a movable hinge 312, a first guide roller 313, a second guide roller 314, and a load roller 315.

The fixed hinge 311 is fixed to the slide door 30F. A proximal end of the movable hinge 312 is rotatably supported by the fixed hinge 311, and a distal end of the movable hinge 312 rotatably supports the first guide roller 313, the second guide roller 314, and the load roller 315. A rotation axis of the movable hinge 312, a rotation axis of the first guide roller 313, and a rotation axis of the second guide roller 314 extend in an up-down direction. A rotation axis of the load roller 315 is orthogonal to the rotation axis of the first guide roller 313 and the rotation axis of the second guide roller 314.

The first guide roller 313, the second guide roller 314, and the load roller 315 of the upper hinge unit 31F are engaged with the upper rail 22F. Specifically, the first guide roller 313 and the second guide roller 314 are engaged with the upper rail 22F in a width direction. In this way, the first guide roller 313 and the second guide roller 314 limit movement of an upper front end of the slide door 30F in a width direction. The load roller 315 is engaged with the upper rail 22F from above. In this way, the load roller 315 supports weight of the slide door 30F.

When the slide door 30F performs an opening-closing operation, the upper hinge unit 31F moves relative to the upper rail 22F by rotation of the first guide roller 313, the second guide roller 314, and the load roller 315 of the upper hinge unit 31F. That is to say, the first guide roller 313, the second guide roller 314, and the load roller 315 move relative to the upper rail 22F in a state of being engaged with the upper rail 22F. Note that the first guide roller 313 and the second guide roller 314 are arrayed in a rotation direction of the movable hinge 312 at an opening operation of the slide door 30F.

As illustrated in FIG. 1, the center hinge unit 32F is arranged at a position close to a rear end of the slide door 30F, and near a center thereof in an up-down direction. As illustrated in FIG. 3, the center hinge unit 32F includes a fixed hinge 321, a movable hinge 322, a first guide roller 323, a second guide roller 324, and a load roller 325.

The fixed hinge 321 is fixed to the slide door 30F. A proximal end of the movable hinge 322 is rotatably supported by the fixed hinge 321, and a distal end of the movable hinge 322 rotatably supports the first guide roller 323, the second guide roller 324, and the load roller 325. A rotation axis of the movable hinge 322, a rotation axis of the first guide roller 323, and a rotation axis of the second guide roller 324 extend in an up-down direction. A rotation axis of the load roller 325 is orthogonal to the rotation axis of the first guide roller 323 and the rotation axis of the second guide roller 324.

The first guide roller 323, the second guide roller 324, and the load roller 325 of the center hinge unit 32F are engaged with the center rail 23F. Specifically, the first guide roller 323 and the second guide roller 324 are engaged with the center rail 23F in a width direction. In this way, the first guide roller 323 and the second guide roller 324 limit movement of a rear end of the slide door 30F in a width direction. The load roller 325 is engaged with the center rail 23F from above. In this way, the load roller 325 supports weight of the slide door 30F.

When the slide door 30F performs an opening-closing operation, the center hinge unit 32F moves relative to the center rail 23F by rotation of the first guide roller 323, the second guide roller 324, and the load roller 325 of the center hinge unit 32F. That is to say, the first guide roller 323, the second guide roller 324, and the load roller 325 move relative to the center rail 23F in a state of being engaged with the center rail 23F. Note that the first guide roller 323 and the second guide roller 324 are arrayed in a rotation direction of the movable hinge 322 at an opening operation of the slide door 30F.

As illustrated in FIG. 1, the lower rail 33F is arranged close to a lower end of the slide door 30F. A length of the lower rail 33F in a front-rear direction is equal to a length of the slide door 30F in a front-rear direction. The lower rail 33F has a substantially constant sectional shape in a longitudinal direction.

As illustrated in FIG. 4, the lower rail 33F includes a frontward and linearly extending first lower rail 331, a second lower rail 332 extending in an arc shape outward in a width direction as it moves frontward from a front end of the first lower rail 331, and a third lower rail 333 linearly extending from a tip of the second lower rail 332. That is to say, a part of the lower rail 33F constituting the second lower rail 332 is curved. The first lower rail 331 is longer than the second lower rail 332 and the third lower rail 333. The lengths of the second lower rail 332 and the third lower rail 333 are substantially equal. When the lower rail 33F, the upper rail 22F, and the center rail 23F are compared, the third lower rail 333 is located on a front side, whereas the third upper rail 223 and the third center rail 233 are located on a rear side. Moreover, curvature radii of the second lower rail 332 and the second center rail 232 are substantially equal. A length of the second lower rail 332 and a length of the third lower rail 333 are equal to a length of the second center rail 232 and a length of the third center rail 233, respectively. Note that a front side in the lower rail 33F is associated with an opening direction of the slide door 30F supported by the lower rail 33F.

The first guide roller 243 and the second guide roller 244 of the lower hinge unit 24F are engaged with the lower rail 33F. Specifically, the first guide roller 243 and the second guide roller 244 are engaged with the center rail 23F in a width direction. In this way, the first guide roller 243 and the second guide roller 244 limit movement of a lower end of the slide door 30F in a width direction.

When the slide door 30F performs an opening-closing operation, the lower rail 33F moves relative to the lower hinge unit 24F by rotation of the first guide roller 243 and the second guide roller 244 of the lower hinge unit 24F. That is to say, the first guide roller 243 and the second guide roller 244 move relative to the lower rail 33F in a state of being engaged with the lower rail 33F. Note that the first guide roller 243 and the second guide roller 244 are arrayed in a rotation direction of the movable hinge 242 at an opening operation of the slide door 30F.

As illustrated in FIG. 1, the door handle 34F is an inside door handle arranged on a surface of the slide door 30F facing toward the inside of the vehicle 10. The slide door 30F may include an outside door handle arranged on a surface of the slide door 30F facing toward the outside of the vehicle 10. The door handle 34F is a part operated by a user when the user manually performs an opening manipulation of the slide door 30F.

The front lock device 35F includes a latch 351 that is locked to the front striker 26F. The front lock device 35F switches between a locked state where the latch 351 is locked to the front striker 26F, and a released state where the latch 351 is not locked to the front striker 26F. The front lock device 35F binds, to the vehicle body 20, the front end of the slide door 30F located at a full closed position, by switching to a locked state.

The lower lock device 36F includes a hook 361 that is locked to the lower striker 27F. The lower lock device 36F switches between a locked state where the hook 361 is locked to the lower striker 27F, and a released state where the hook 361 is not locked to the lower striker 27F. The lower lock device 36F binds, to the vehicle body 20, the lower end of the slide door 30F located at a full closed position, by switching to a locked state.

The front lock drive device 37F drives the front lock device 35F. Specifically, the front lock drive device 37F shifts the front lock device 35F from a released state to a locked state, or shifts the front lock device 35F from a locked state to a released state. The front lock drive device 37F shifts the front lock device 35F from a released state to a locked state after the slide door 30F is operated to near a full closed position, and thereby moves the slide door 30F to a full closed position. On the other hand, the front lock drive device 37F shifts the front lock device 35F from a locked state to a released state when performing an opening operation of the slide door 30F from a full closed position, and thereby releases binding of the slide door 30F by the front lock device 35F.

The lower lock drive device 38F drives the lower lock device 36F. Specifically, the lower lock drive device 38F shifts the lower lock device 36F from a released state to a locked state. The lower lock drive device 38F shifts the lower lock device 36F to a locked state after the front lock drive device 37F shifts the front lock device 35F to a locked state, i.e., the slide door 30F is located at a full closed position. In this way, the lower lock drive device 38F binds the lower end of the slide door 30F to the vehicle body 20.

The remote controller 39F transmits power between the door handle 34F, the front lock device 35F, and the lower lock device 36F. The remote controller 39F is coupled to the door handle 34F, the front lock device 35F, and the lower lock device 36F by, for example, a power transmission member such as a lever and a wire. The remote controller 39F shifts the lower lock device 36F from a locked state to a released state when the front lock drive device 37F shifts the front lock device 35F from a locked state to a released state. Similarly, the remote controller 39F shifts the front lock device 35F and the lower lock device 36F from a locked state to a released state when the user performs an opening manipulation of the door handle 34F.

<Slide Door 30R>

Next, the slide door 30R is described.

The slide door 30R includes an upper hinge unit 31R, a center hinge unit 32R, a lower rail 33R, a door handle 34R, a rear lock device 35R, a lower lock device 36R, a rear lock drive device 37R, a lower lock drive device 38R, and a remote controller 39R. The slide door 30R is configured similarly to the slide door 30F except that opening and closing directions are opposite direction. Thus, description of the slide door 30R is omitted.

In this embodiment, one example of a "slide door support device 100F (100)" is configured including the upper rail 22F, the center rail 23F, and the lower rail 33F as well as the upper hinge unit 31F, the center hinge unit 32F, and the lower hinge unit 24F. The slide door support device 100F is a device that couples the slide door 30F to the vehicle body 20 movably between a full opening position and a full closed position. Similarly, in this embodiment, one example of a "slide door support device 100R (100)" is configured including the upper rail 22R, the center rail 23R, and the lower rail 33R as well as the upper hinge unit 31R, the center hinge unit 32R, and the lower hinge unit 24R. The slide door support device 100R is a device that couples the slide door 30R to the vehicle body 20 movably between a full opening position and a full closed position.

<Cover Device 40>

Next, the cover device 40 is described.

As illustrated in FIGS. 5 to 9, the cover device 40 includes a protection plate 41, a cover 42, and an open-close mechanism 50.

Figure 5:
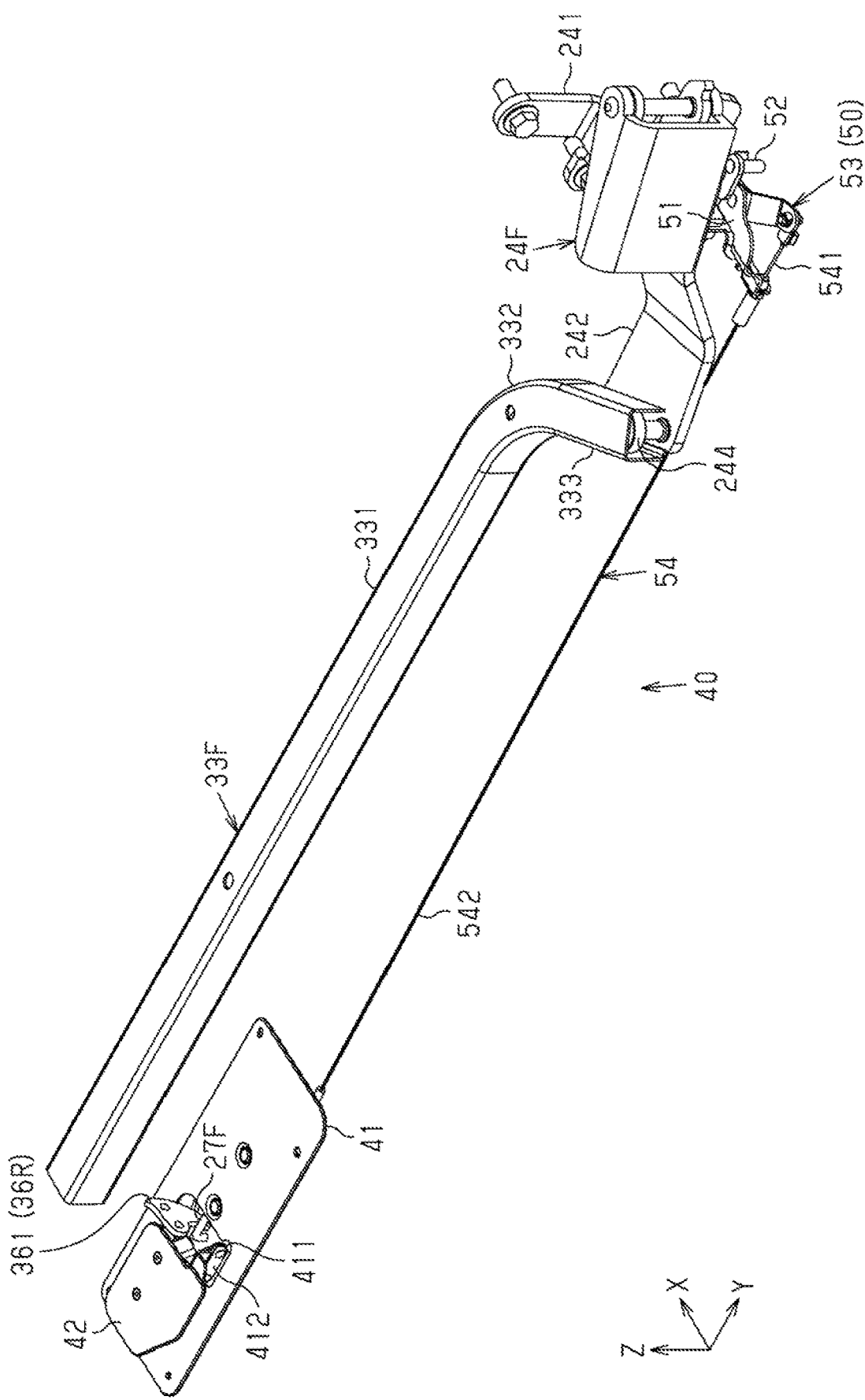
FIG. 5 is a perspective view of a lower hinge unit and the cover device.

As illustrated in FIG. 5, the protection plate 41 has a rectangular shape in a plane view in an up-down direction. The protection plate 41 covers the lower striker 27F in a bottom portion of the door opening 21. In other words, the protection plate 41 configures a part of the bottom portion of the door opening 21. The protection plate 41 has an exposure hole 411 penetrating in a plate thickness direction. The exposure hole 411 is located above the lower striker 27F. Thus, the exposure hole 411 exposes the lower striker 27F upward. The protection plate 41 has a bent portion 412 bent downward from an opening edge of the exposure hole 411.

As illustrated in FIG. 5, the cover 42 has a plate shape. The cover 42 is one size larger than the exposure hole 411 in a plane view in an up-down direction. Thus, when the cover 42 closes the exposure hole 411, the lower striker 27F is not exposed upward via the exposure hole 411.

Figure 6:
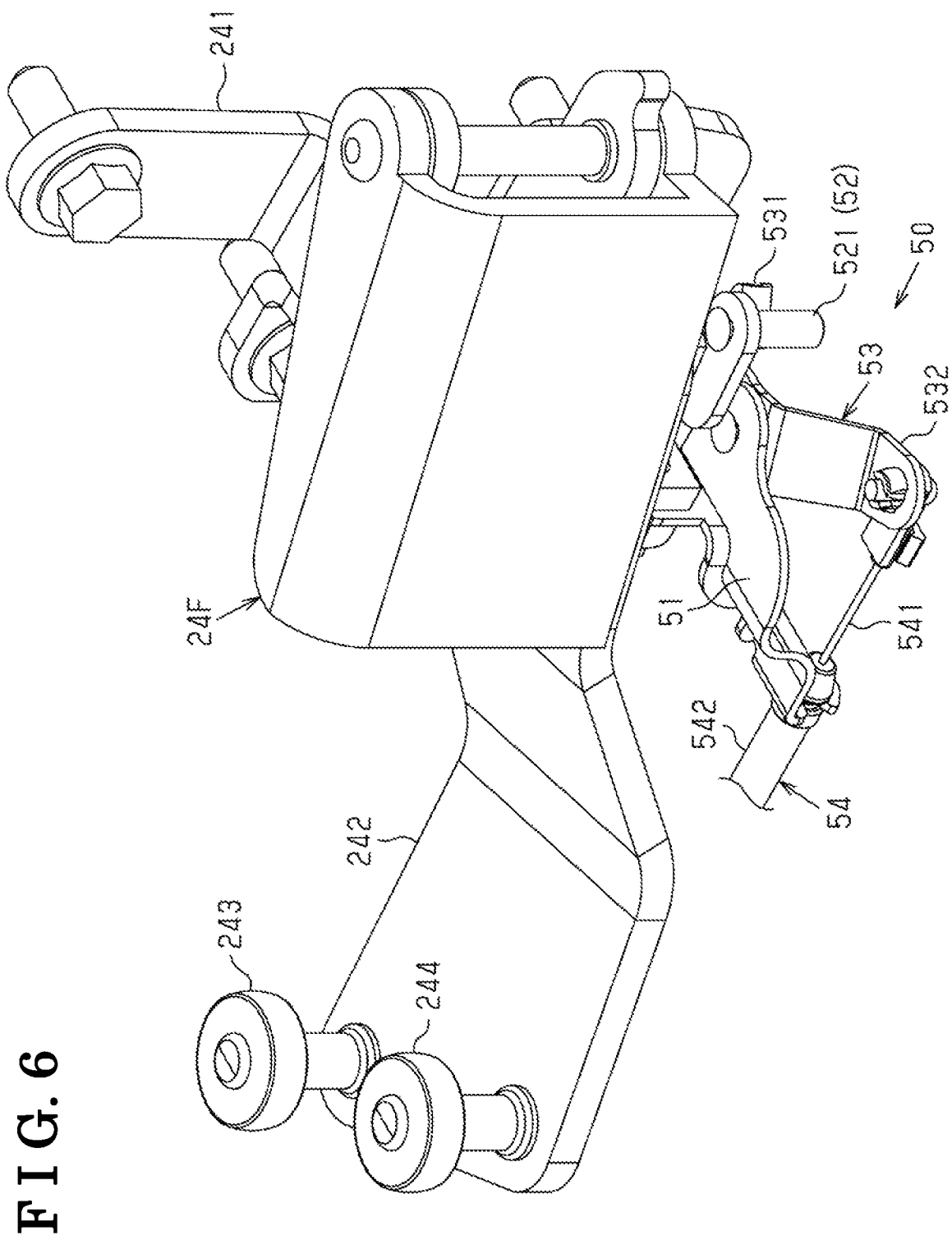
FIG. 6 is an enlarged perspective view illustrating the lower hinge unit and a part of the cover device.
Figure 7:
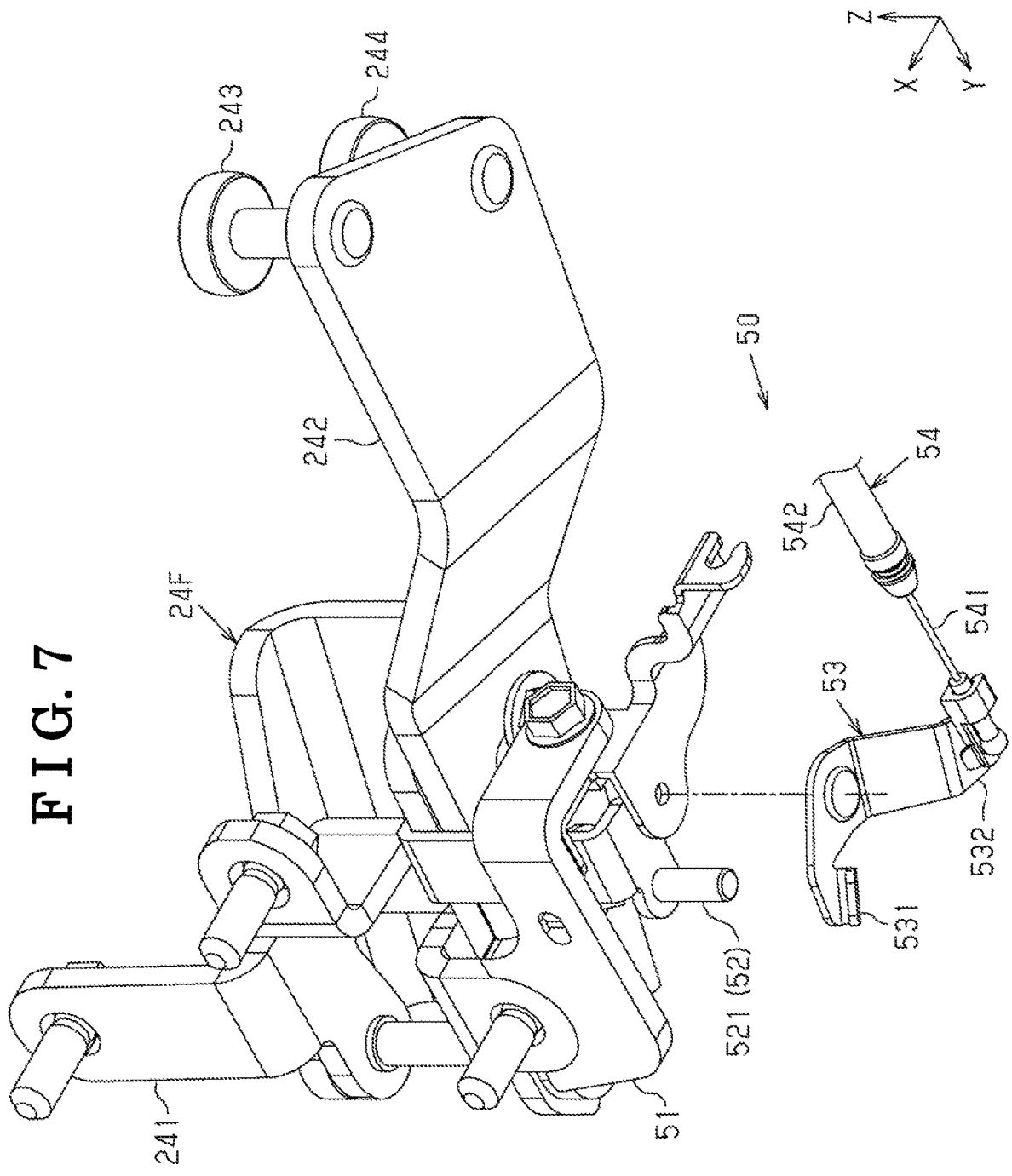
FIG. 7 is an enlarged perspective view illustrating the lower hinge unit and a part of the cover device.
Figure 8:
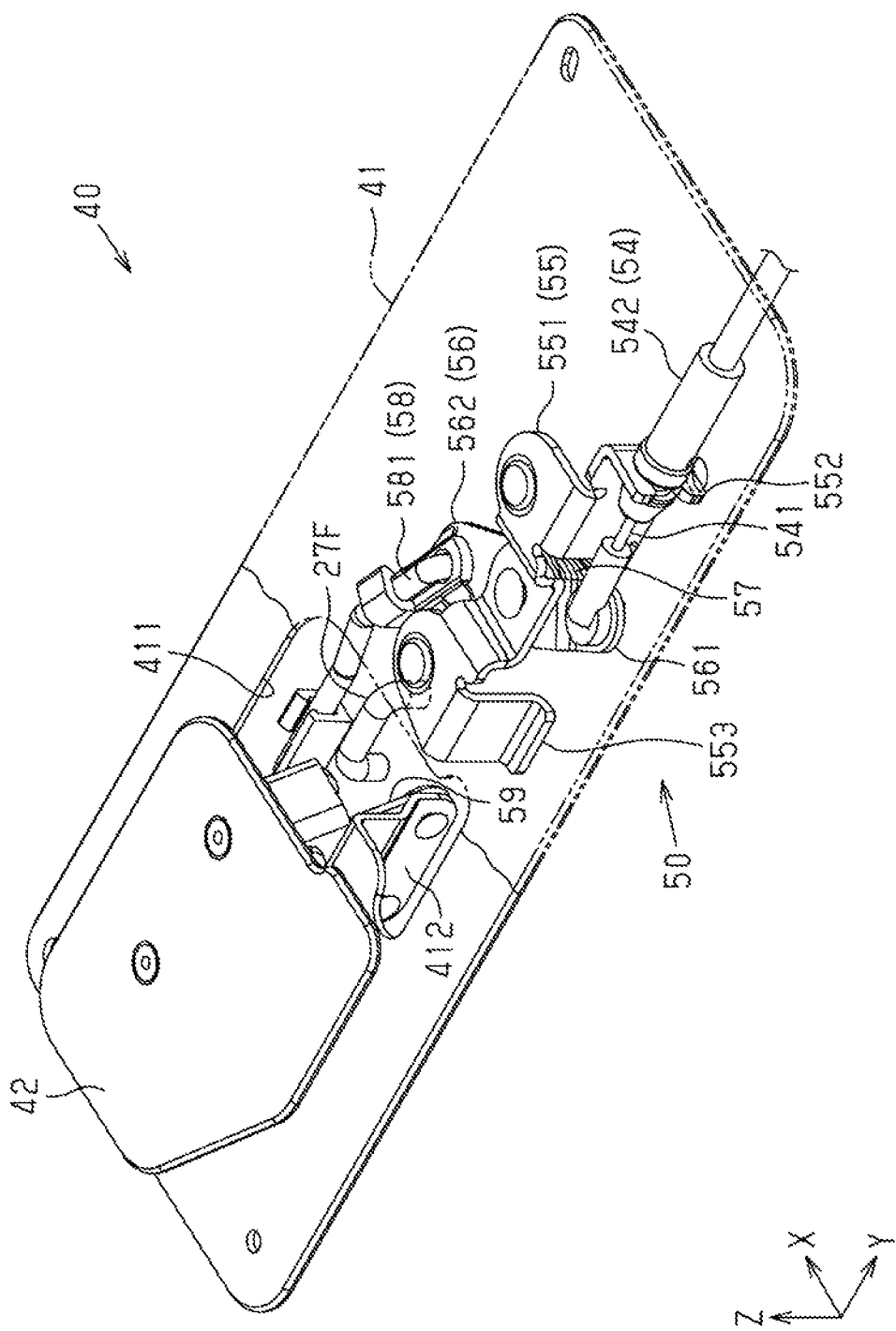
FIG. 8 is an enlarged perspective view illustrating a part of the cover device.
Figure 9:
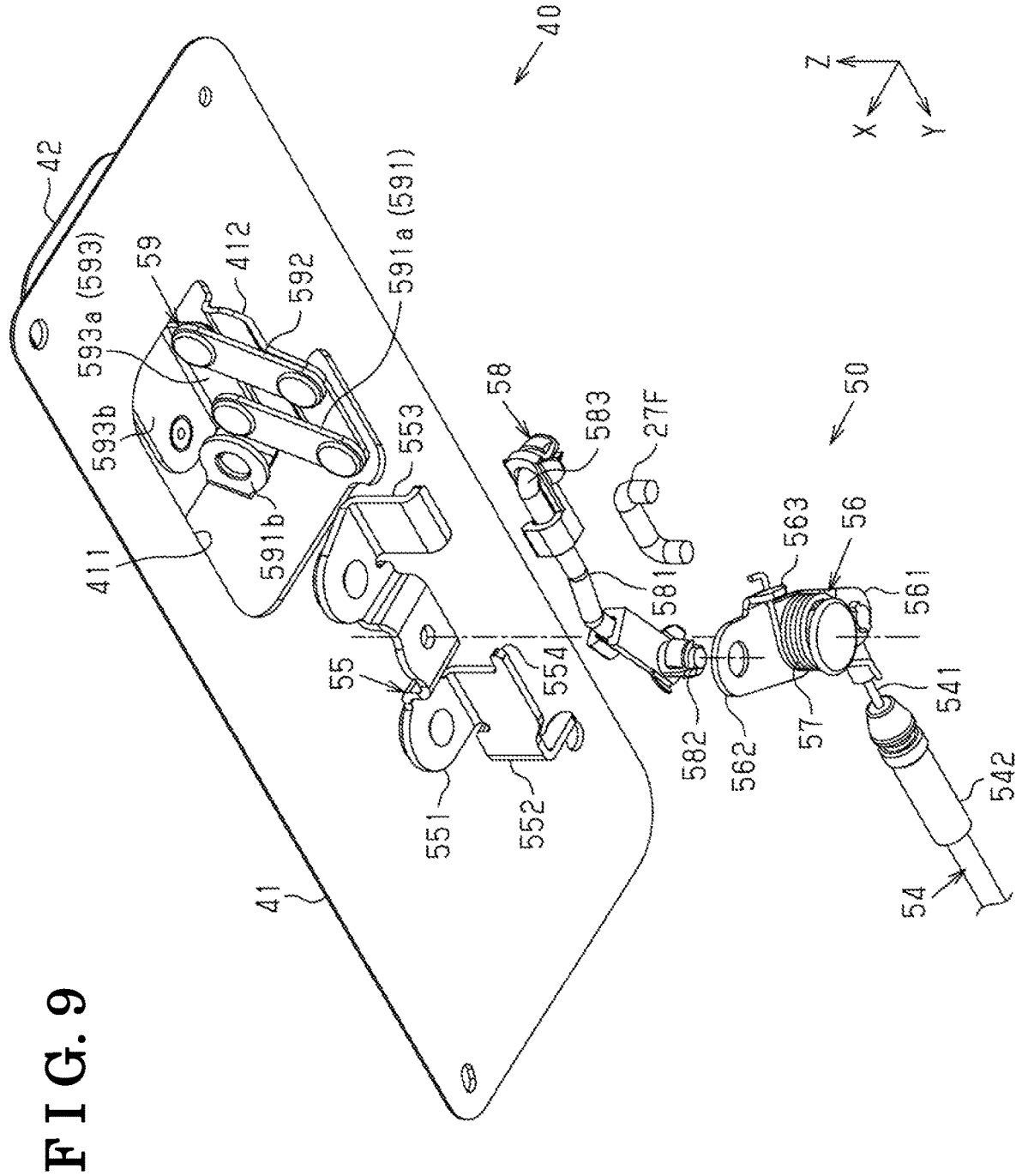
FIG. 9 is an enlarged perspective view illustrating a part of the cover device.

As illustrated in FIGS. 6 and 7, the open-close mechanism 50 includes a hinge bracket 51, a drive lever 52, a driven lever 53, and a cable 54. As illustrated in FIGS. 8 and 9, the open-close mechanism 50 includes a cover bracket 55, a rotation lever 56, a torsion coil spring 57, a coupling shaft 58, and a link mechanism 59. As illustrated in FIGS. 6 and 7, the hinge bracket 51, the drive lever 52, and the driven lever 53 are arranged near the lower hinge unit 24F. As illustrated in FIGS. 8 and 9, the cover bracket 55, the rotation lever 56, the torsion coil spring 57, the coupling shaft 58, and the link mechanism 59 are arranged near the lower striker 27F.

As illustrated in FIGS. 6 and 7, the hinge bracket 51 is fixed to the fixed hinge 241 of the lower hinge unit 24F. That is to say, the hinge bracket 51 does not move even when the slide door 30F performs an opening-closing operation, i.e., even when the movable hinge 242 rotates relative to the fixed hinge 241. In this point, the hinge bracket 51 may be fixed not to the fixed hinge 241 but to the vehicle body 20. The hinge bracket 51 extends outward in a width direction after extending forward from the fixed hinge 241. The hinge bracket 51 can also be constituted of a plurality of members as illustrated, or constituted of one member.

The drive lever 52 is fixed to the movable hinge 242 of the lower hinge unit 24F. The drive lever 52 rotates together with the movable hinge 242 when the movable hinge 242 rotates relative to the fixed hinge 241. That is to say, a rotation axis of the drive lever 52 is in alignment with a rotation axis of the movable hinge 242. The drive lever 52 is provided at a position closer to a proximal end of the movable hinge 242 than to a distal end thereof. The drive lever 52 has a downwardly extending columnar pin 521.

The driven lever 53 is rotatably supported by the hinge bracket 51. A rotation axis of the driven lever 53 extends in an up-down direction in this embodiment, but a rotation axis of the driven lever 53 may extend in a direction intersecting an up-down direction in another embodiment. The driven lever 53 includes a first arm 531 and a second arm 532 extending in a direction intersecting the rotation axis of the driven lever 53. A tip of the first arm 531 is a part that contacts the pin 521 of the drive lever 52, and a tip of the second arm 532 is a part that supports a first end of the cable 54.

The cable 54 includes a metallic wire 541, and a tubular wire protection portion 542. Both ends of the wire 541 are exposed from the wire protection portion 542, and an intermediate portion of the wire 541 is stored in the wire protection portion 542. A first end of the wire 541 is fixed to the tip of the second arm 532 of the driven lever 53, and a first end of the wire protection portion 542 is fixed to the hinge bracket 51. Thus, when the driven lever 53 rotates relative to the hinge bracket 51, the wire 541 moves back and forth relative to the wire protection portion 542. Note that the cable 54 may be routed below the bottom portion of the door opening 21 in the vehicle body 20.

As illustrated in FIGS. 8 and 9, the cover bracket 55 includes an upper wall 551 fixed to the protection plate 41, and a first sidewall 552 and a second sidewall 553 extending downward from the upper wall 551. The first sidewall 552 includes a lock piece 554 extending toward the second sidewall 553. The first sidewall 552 supports a second end of the wire protection portion 542.

The rotation lever 56 is rotatably supported by the upper wall 551 of the cover bracket 55. A rotation axis of the rotation lever 56 extends in an up-down direction. The rotation lever 56 includes a third arm 561 and a fourth arm 562 extending in a direction orthogonal to the rotation axis of the rotation lever 56. The third arm 561 and the fourth arm 562 extend in directions opposite to each other. A second end of the wire 541 is connected to a distal end of the third arm 561. In this point, the wire 541 is a member that transmits power between the driven lever 53 and the rotation lever 56. The fourth arm 562 includes a lock piece 563 that is bent along the rotation axis of the rotation lever 56 and then extends toward the third arm 561.

The torsion coil spring 57 is equivalent to one example of a "biasing member". One end of the torsion coil spring 57 is locked to the lock piece 554 of the cover bracket 55, and another end of the torsion coil spring 57 is locked to the lock piece 563 of the rotation lever 56. The torsion coil spring 57 biases the rotation lever 56 in a direction in which the rotation lever 56 pulls the wire 541. In another embodiment, the torsion coil spring 57 can be a spring that biases the wire 541, or can be a spring that biases the drive lever 52 or the driven lever 53. In this case, the torsion coil spring 57 may be another spring of a different kind.

The coupling shaft 58 is bar-shaped. The coupling shaft 58 includes a long intermediate shaft 581, a first bent shaft 582 bent and extending from one end of the intermediate shaft 581, and a second bent shaft 583 bent and extending from another end of the intermediate shaft 581. The first bent shaft 582 is coupled to a distal end of the fourth arm 562 of the rotation lever 56.

As illustrated in FIG. 9, the link mechanism 59 includes a drive link 591 and a driven link 592 that are supported by the bent portion 412 of the protection plate 41, and an intermediate link 593 coupling the drive link 591 and the driven link 592. In this embodiment, a four-link mechanism, specifically, a lever crank mechanism is configured, including the bent portion 412 of the protection plate 41 equivalent to a "fixing link", the drive link 591, the driven link 592, and the intermediate link 593.

The drive link 591 includes a link main body 591a having substantially the same shape as the driven link 592, and a coupling portion 591b bent and extending from the link main body 591a. One end of the link main body 591a is rotatably coupled to the bent portion 412 of the protection plate 41, and another end of the link main body 591a is rotatably coupled to the intermediate link 593. A second bent shaft 583 of the coupling shaft 58 is coupled to the coupling portion 591b. The coupling portion 591b is a part that receives power for rotating the drive link 591, and may therefore be arranged at a position closer to a coupling part of the link main body 591a to the intermediate link 593 than to a coupling part of the link main body 591a to the bent portion 412. One end of the driven link 592 is rotatably coupled to the bent portion 412 of the protection plate 41, and another end of the driven link 592 is rotatably coupled to the intermediate link 593.

The intermediate link 593 includes a link main body 593a, and a fixed portion 593b bent from the link main body 593a. The link main body 593a has a rectangular shape in a side view in a width direction. A distance between a coupling center to the drive link 591 and a coupling center to the driven link 592 in the link main body 593a is equal to a distance between a coupling center to the drive link 591 and a coupling center to the driven link 592 in the bent portion 412 of the protection plate 41. The fixed portion 593b has a flat shape. The protection plate 41 is fixed to the fixed portion 593b. Thus, when the intermediate link 593 operates, the protection plate 41 also operates together with the intermediate link 593. Note that a fastening member such as a bolt may be used to fix the protection plate 41 to the fixed portion 593b.

<Action of Cover Device 40>

An action according to this embodiment is described.

Specifically, an action of the cover device 40 at an opening operation of the slide door 30F is described. Although the following description focuses on the slide door 30F, a similar action can be obtained in the slide door 30R as well.

Figure 10:
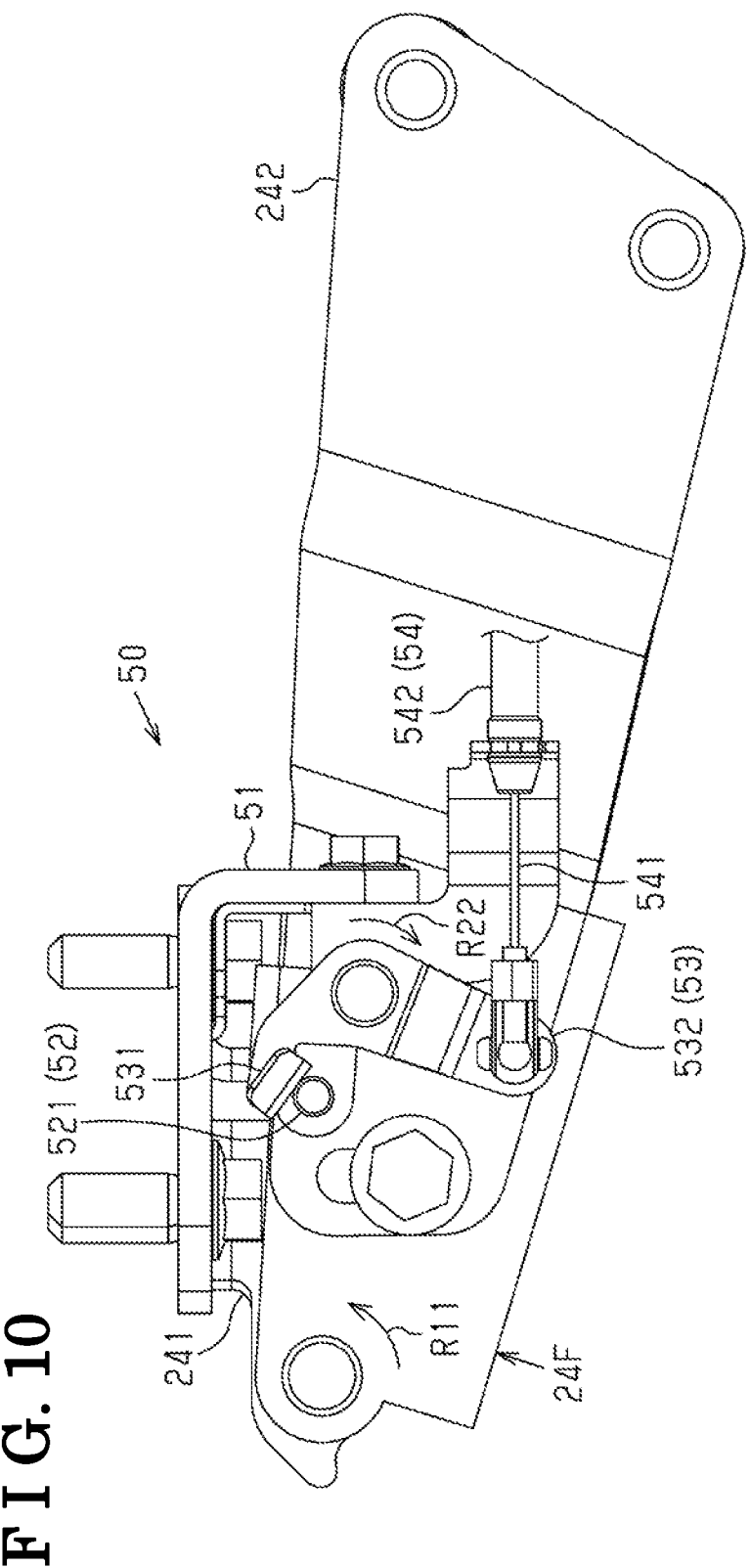
FIG. 10 is a bottom view illustrating the lower hinge unit and a part of the cover device when a slide door is located at a full closed position.
Figure 11:
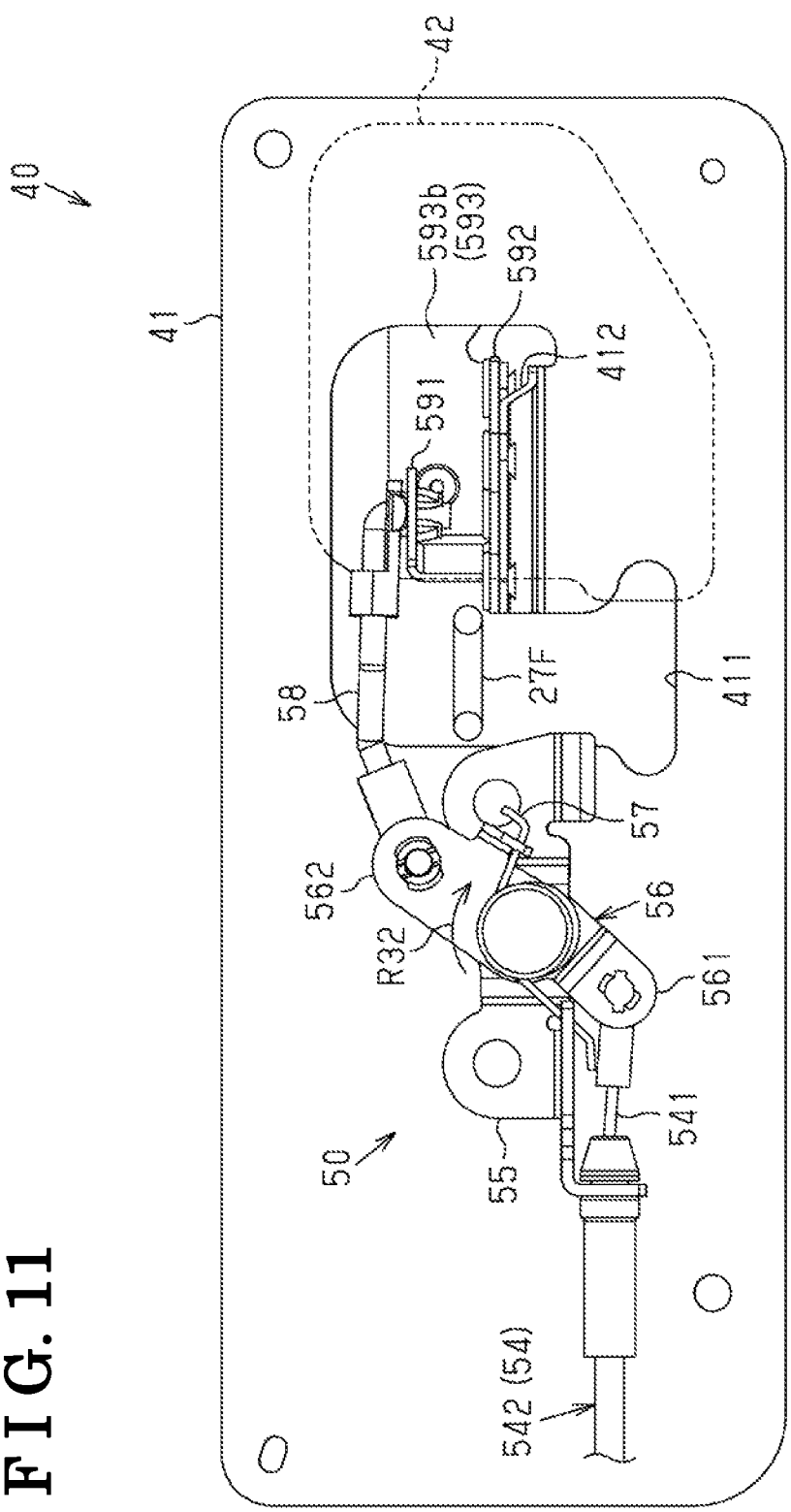
FIG. 11 is a bottom view illustrating a part of the cover device when the slide door is located at a full closed position.
Figure 12:
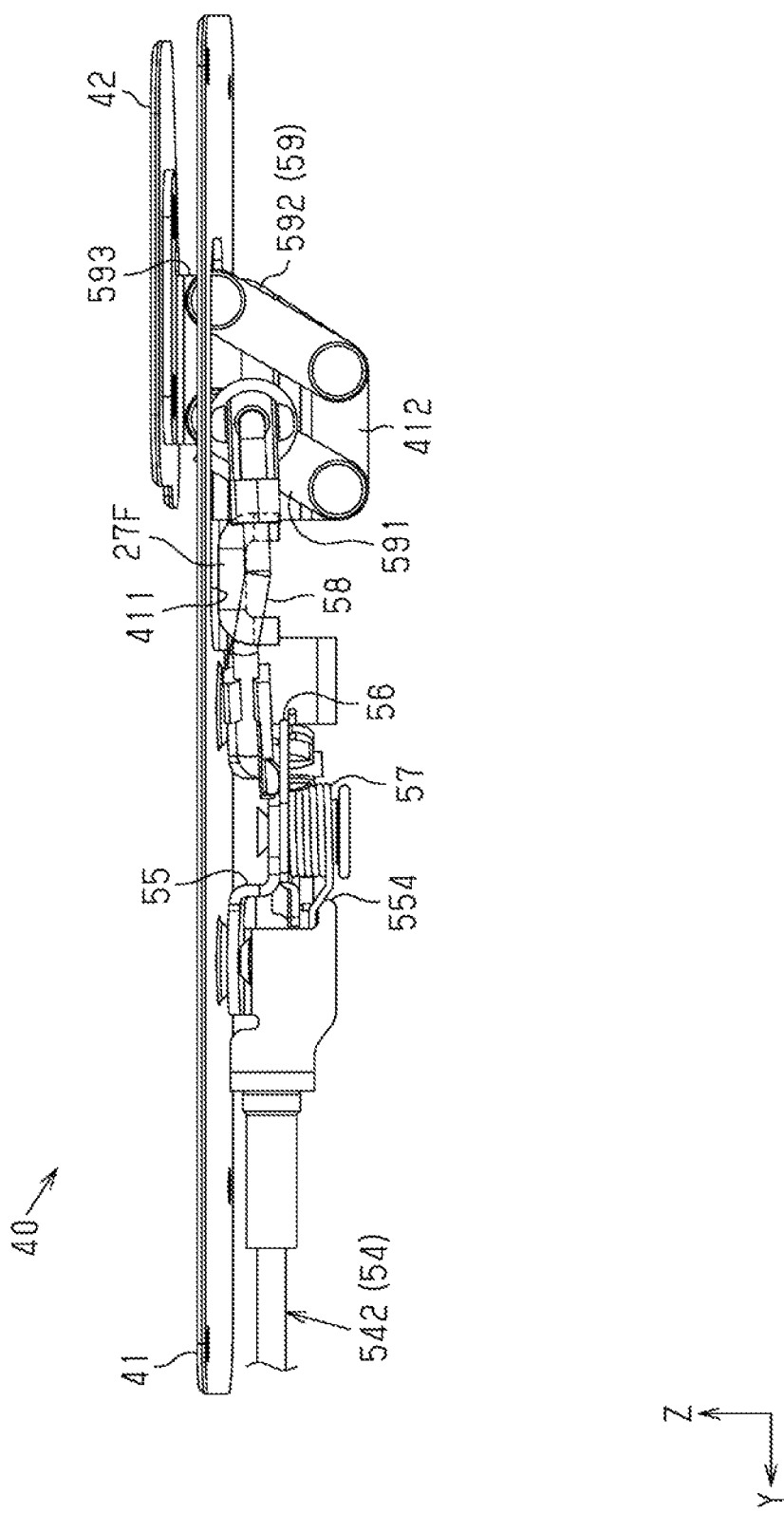
FIG. 12 is a side view illustrating a part of the cover device when the slide door is located at a full closed position.

FIGS. 10 to 12 illustrate the open-close mechanism 50 when the slide door 30F is located at a full closed position.

When the slide door 30F is located at a full closed position, the movable hinge 242 rotates in a first direction R11 the most, relative to the fixed hinge 241, as illustrated in FIG. 10. Similarly, the drive lever 52 rotates in the first direction R11 the most, relative to the fixed hinge 241. Thus, the pin 521 of the drive lever 52 presses the first arm 531 of the driven lever 53, and the driven lever 53 rotates in a second direction R22. As a result, the second arm 532 of the driven lever 53 pulls the wire 541 frontward.

As illustrated in FIGS. 11 and 12, when the driven lever 53 pulls the wire 541, the third arm 561 of the rotation lever 56 is pulled frontward by force transmitted via the wire 541. Thus, the rotation lever 56 rotates in a second direction R32 against biasing force of the torsion coil spring 57. Then, the fourth arm 562 of the rotation lever 56 presses the drive link 591 via the coupling shaft 58. In this way, as illustrated in FIG. 12, the drive link 591 and the driven link 592 rotate in a direction of rising relative to the bent portion 412, and the cover 42 is located at an exposure position.

As described above, when the slide door 30F is located at a full closed position, the cover 42 is located at an exposure position where the lower striker 27F is exposed upward, as illustrated in FIG. 5. Thus, as illustrated in FIG. 5, the hook 361 of the lower lock device 36F becomes able to be locked to the lower striker 27F. In other words, the lower lock device 36F becomes able to bind the lower end of the slide door 30F located at a full closed position to the vehicle body 20. When the cover 42 is located at an exposure position as illustrated in FIG. 12, a gap is formed between the cover 42 and the protection plate 41 in an up-down direction. That is to say, the cover 42 is lifted from the protection plate 41, but the cover 42 does not contact the slide door 30F.

Figure 13:
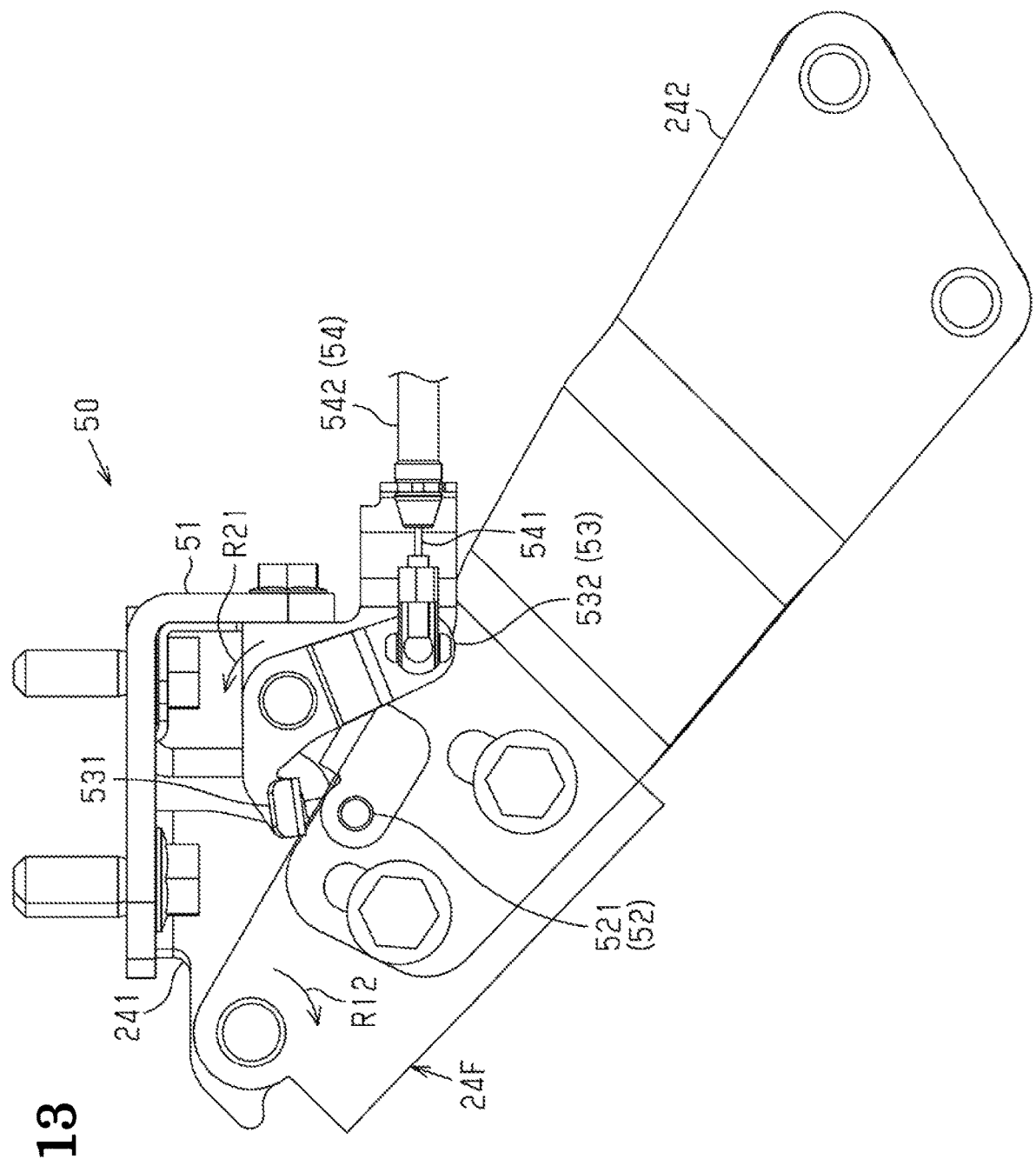
FIG. 13 is a bottom view illustrating the lower hinge unit and a part of the cover device when the slide door performs an opening operation from a full closed position.
Figure 14:
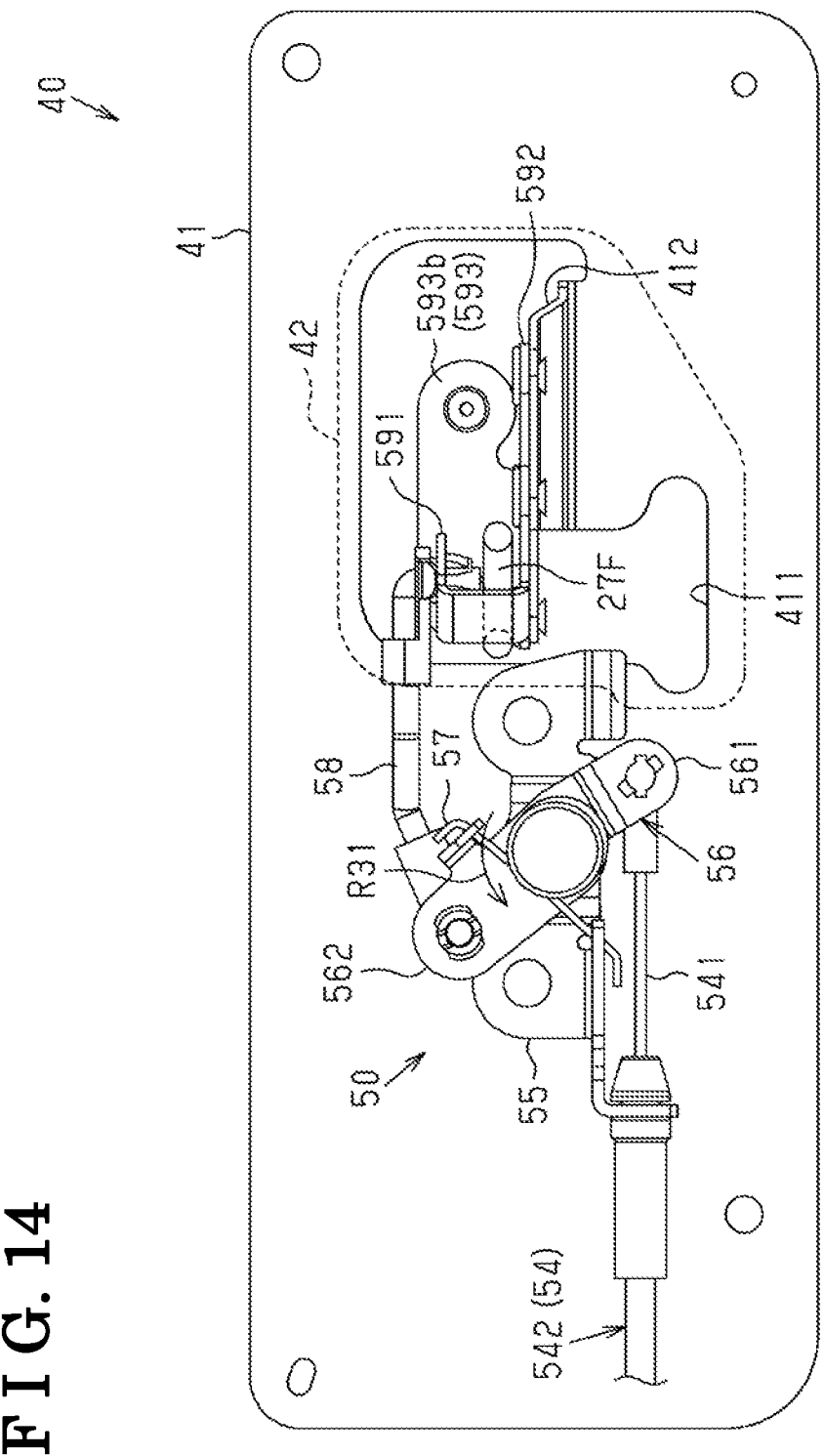
FIG. 14 is a bottom view illustrating a part of the cover device when the slide door performs an opening operation from a full closed position.
Figure 15:
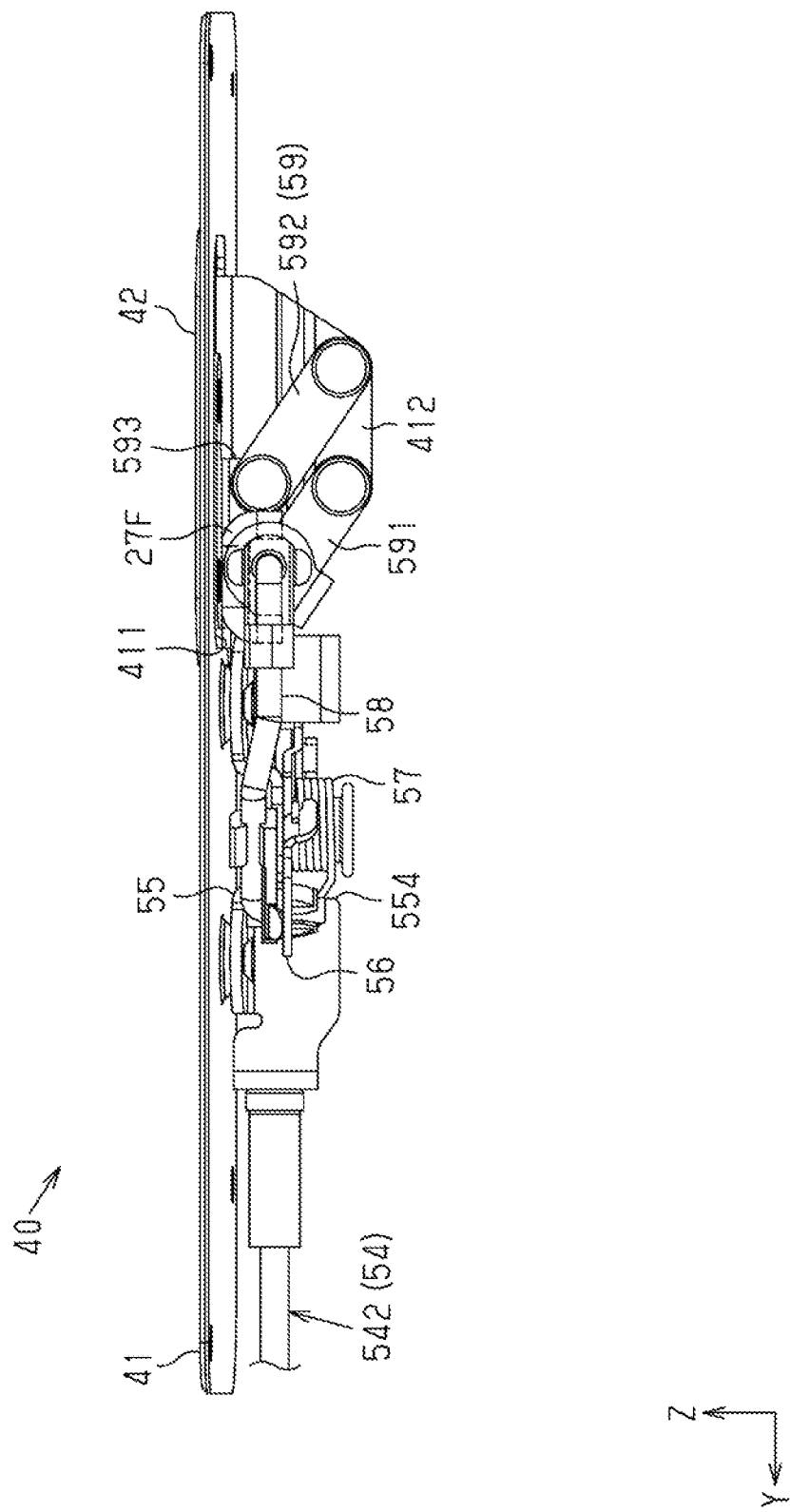
FIG. 15 is a side view illustrating a part of the cover device when the slide door performs an opening operation from a full closed position.

FIGS. 13 to 15 illustrate the open-close mechanism 50 when the slide door 30F slightly performs an opening operation from a full closed position.

When the slide door 30F is caused to perform an opening operation from a full closed position, the front lock device 35F and the lower lock device 36F are first shifted from a locked state to a released state. Thereafter, the slide door 30F unbound from the vehicle body 20 is caused to perform an opening operation.

When the slide door 30F slightly performs an opening operation from a full closed position, the movable hinge 242 rotates in a second direction R12 relative to the fixed hinge 241, as illustrated in FIG. 13. Similarly, the drive lever 52 rotates in the second direction R12 relative to the fixed hinge 241. Accordingly, the pin 521 of the drive lever 52 no longer presses the first arm 531 of the driven lever 53, and thus the second arm 532 of the driven lever 53 no longer pulls the wire 541 frontward.

As illustrated in FIGS. 14 and 15, when the driven lever 53 does not pull the wire 541, no force that pulls the third arm 561 frontward relative to the rotation lever 56 acts. Thus, the rotation lever 56 rotates in a first direction R31 according to biasing force of the torsion coil spring 57. Accordingly, the rotation lever 56 pulls the drive link 591 via the coupling shaft 58. Thus, as illustrated in FIG. 15, the drive link 591 and the driven link 592 rotate in a direction of collapsing relative to the bent portion 412 of the protection plate 41, and the cover 42 is located at a covering position where the lower striker 27F is not exposed upward. Note that the cover 42 is displaced in such a way as to draw an arc from an exposure position toward a covering position. That is to say, a displacement direction between an exposure position and a covering position of the cover 42 is a direction intersecting a width direction.

Note that when the rotation lever 56 rotates in the first direction R31 as illustrated in FIG. 14, the third arm 561 of the rotation lever 56 pulls the wire 541 rearward. Thus, as illustrated in FIG. 13, the second arm 532 of the driven lever 53 is pulled rearward, and thereby the driven lever 53 rotates in a first direction R21.

Figure 16:
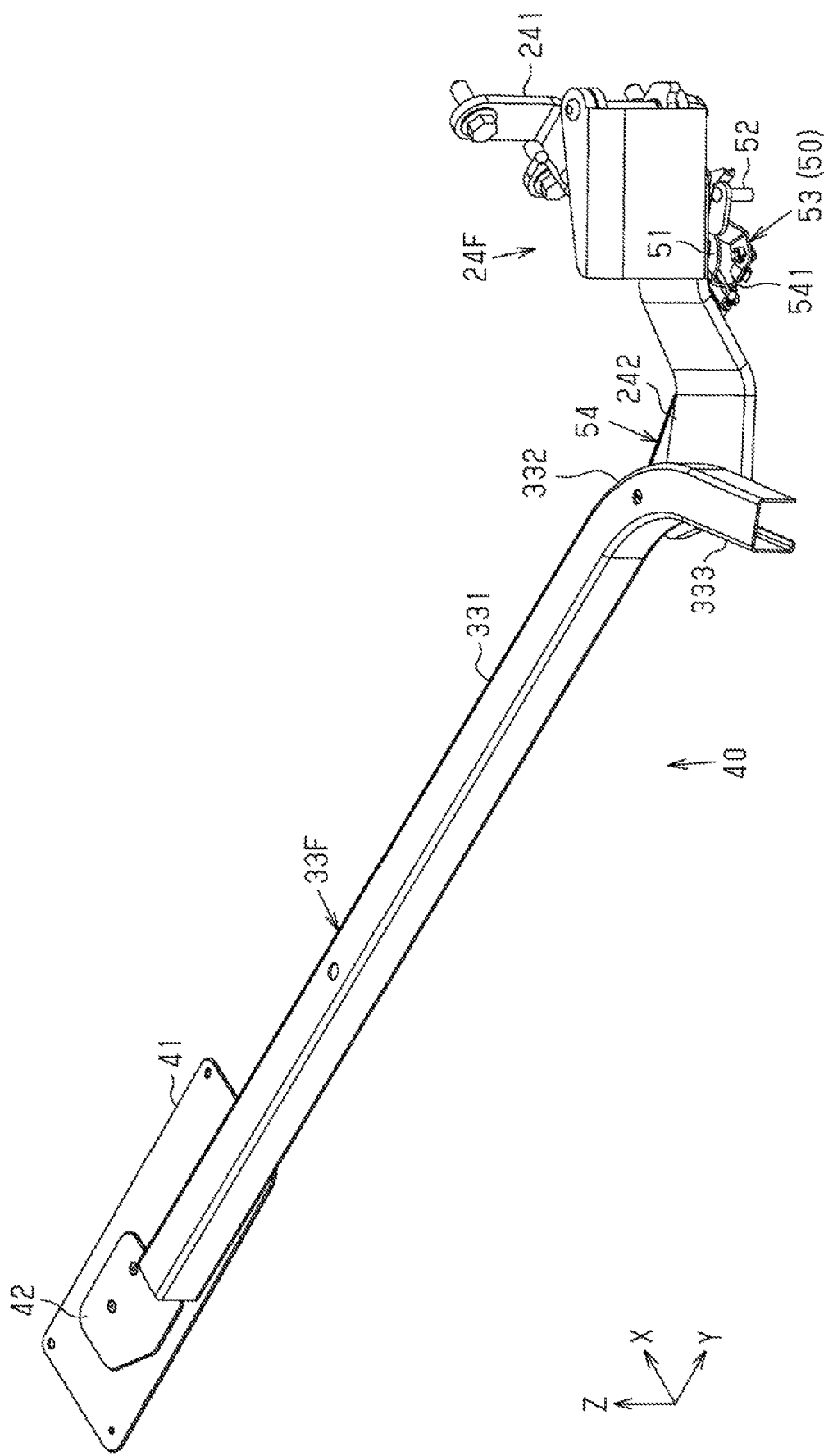
FIG. 16 is a perspective view of the lower hinge unit and the cover device when the slide door performs an opening operation from a full closed position.

As described above, when the slide door 30F performs an opening operation from a full closed position, the cover 42 is located at a covering position where the striker is covered, as illustrated in FIG. 16. Thus, after the slide door 30F arrives at a full opening position, the lower striker 27F is not exposed in the bottom portion of the door opening 21, or the exposure hole 411 is not exposed in the bottom portion of the door opening 21.

<Action of Slide Door Support Device 100F>

Now, an action of the slide door support device 100F when the slide door 30F performs an opening-closing operation is described.

As illustrated in FIG. 1, in this embodiment, the slide door 30F is coupled to the vehicle body 20 via three coupling parts C1, C2, and C3.

The first coupling part C1 is a part to which the upper hinge unit 31F is mounted in the slide door 30F. That is to say, the first coupling part C1 is at a position close to the front end of the slide door 30F, and close to the upper end of the slide door 30F.

The second coupling part C2 is a part to which the center hinge unit 32F is mounted in the slide door 30F. That is to say, the second coupling part C2 is at a position close to the rear end of the slide door 30F, and a position that is intermediate in an up-down direction of the slide door 30F.

In the lower rail 33F of the slide door 30F, the third coupling part C3 is a part with which the first guide roller 243 and the second guide roller 244 of the lower hinge unit 24F are engaged. That is to say, the third coupling part C3 is at a position close to the lower end of the slide door 30F, and a position that moves in a front-rear direction depending on an opening of the slide door 30F. For example, when the slide door 30F is located at a full closed position, the third coupling part C3 is at a position close to a tip of the slide door 30F in an opening direction. On the other hand, when the slide door 30F is located at a full opening position, the third coupling part C3 is at a position close to a tip of the slide door 30F in a closing direction.

As illustrated in FIG. 3, when the slide door 30F performs an opening operation from a full closed position toward a full opening position, an engagement target of the first guide roller 323 and the second guide roller 324 of the center hinge unit 32F changes in an order of the third center rail 233, the second center rail 232, and the first center rail 231.

Since the third center rail 233 is linear, the movable hinge 322 does not rotate relative to the fixed hinge 321 when the center hinge unit 32F moves relative to the third center rail 233. Thus, when the center hinge unit 32F moves relative to the third center rail 233, the center hinge unit 32F moves in accordance with a formation direction of the third center rail 233. Consequently, when the center hinge unit 32F moves relative to the third center rail 233, the second coupling part C2 of the slide door 30F moves outward in a width direction as it moves in an opening direction.

Since the second center rail 232 has an arc shape, the movable hinge 322 rotates relative to the fixed hinge 321 when the center hinge unit 32F moves relative to the second center rail 232. Thus, when the center hinge unit 32F moves relative to the second center rail 232, the center hinge unit 32F moves in accordance with a formation direction of the second center rail 232, and moves according to rotation of the movable hinge 322. Consequently, the second coupling part C2 of the slide door 30F greatly moves outward in a width direction as it moves in an opening direction. Note that when at least one guide roller of the center hinge unit 32F moves along the second center rail 232, the movable hinge 322 rotates relative to the fixed hinge 321.

Since the first center rail 231 is linear, the movable hinge 322 does not rotate relative to the fixed hinge 321 when the center hinge unit 32F moves relative to the first center rail 231. Thus, when the center hinge unit 32F moves relative to the first center rail 231, the center hinge unit 32F moves in accordance with a formation direction of the first center rail 231. Therefore, the second coupling part C2 of the slide door 30F hardly moves in a width direction, and moves in an opening direction.

Herein, in a case where the center hinge unit 32F moves along the second center rail 232, the movable hinge 322 rotates, in contrast to a case where the center hinge unit 32F moves along the third center rail 233. Thus, in a case where the center hinge unit 32F moves along the second center rail 232, a movement amount (hereinafter, also referred to as a "lift amount") of the slide door 30F in a width direction of the second coupling part C2 greatly changes more than in a case where the center hinge unit 32F moves along the third center rail 233.

Moreover, in a case where the center hinge unit 32F moves along the first center rail 231, a lift amount of the second coupling part C2 of the slide door 30F substantially does not change, in contrast to a case where the center hinge unit 32F moves along the second center rail 232. Note that a lift amount is an outward movement amount of the slide door 30F in a width direction with respect to a full closed position.

Therefore, when the first guide roller 323 of the center hinge unit 32F crosses a boundary portion between the third center rail 233 and the second center rail 232 at an opening operation of the slide door 30F, a lift amount of the second coupling part C2 of the slide door 30F discontinuously changes at a point where the movable hinge 322 of the center hinge unit 32F starts rotating. Similarly, when the second guide roller 324 of the center hinge unit 32F crosses a boundary portion between the second center rail 232 and the first center rail 231 at an opening operation of the slide door 30F, a lift amount of the second coupling part C2 of the slide door 30F discontinuously changes at a point where the movable hinge 322 of the center hinge unit 32F stops rotating. Such a tendency also holds true with not only a time of an opening operation of the slide door 30F but also a time of a closing operation of the slide door 30F.

Furthermore, such a tendency also holds true with the first coupling part C1 and the third coupling part C3 of the slide door 30F. That is to say, when the first guide roller 313 of the upper hinge unit 31F crosses a boundary portion between the third upper rail 223 and the second upper rail 222 at an opening-closing operation of the slide door 30F, a lift amount of the first coupling part C1 of the slide door 30F discontinuously changes. Moreover, when the second guide roller 314 of the upper hinge unit 31F crosses a boundary portion between the second upper rail 222 and the first upper rail 221, a lift amount of the first coupling part C1 of the slide door 30F discontinuously changes.

Similarly, when the first guide roller 243 of the lower hinge unit 24F crosses a boundary portion between the third lower rail 333 and the second lower rail 332 at an opening-closing operation of the slide door 30F, a lift amount of the third coupling part C3 of the slide door 30F discontinuously changes. Moreover, when the second guide roller 244 of the lower hinge unit 24F crosses a boundary portion between the second lower rail 332 and the first lower rail 331, a lift amount of the third coupling part C3 of the slide door 30F discontinuously changes.

Herein, when the slide door 30F is located near a full opening position, the first coupling part C1, the second coupling part C2, and the third coupling part C3 are located apart in an up-down direction and a front-rear direction. In this case, an attitude of the slide door 30F easily becomes stable in that parts where the vehicle body 20 supports the slide door 30F are scattered. In contrast, when the slide door 30F is located near a full closed position as illustrated in FIG. 1, the first coupling part C1, the second coupling part C2, and the third coupling part C3 are not located apart in an up-down direction and a front-rear direction. Specifically, the second coupling part C2 and the third coupling part C3 are located close to each other. In this case, an attitude of the slide door 30F easily becomes unstable in that parts where the vehicle body 20 supports the slide door 30F are not scattered.

Thus, if lift amounts of the second coupling part C2 and the third coupling part C3 are different when the slide door 30F is located near a full closed position, an attitude of the slide door 30F easily varies. For example, when a difference between a lift amount of the second coupling part C2 and a lift amount of the third coupling part C3 is large in the slide door 30F, the slide door 30F will be tilted. Specifically, the slide door 30F will be tilted around an axis linking a contact point between the upper rail 22F and the load roller 315 of the upper hinge unit 31F to a contact point between the center rail 23F and the load roller 325 of the center hinge unit 32F. In this case, there is a concern that force necessary for an opening-closing operation of the slide door 30F increases near a full closed position, or a weather strip cannot be evenly collapsed at an opening-closing operation of the slide door 30F.

Figure 17:
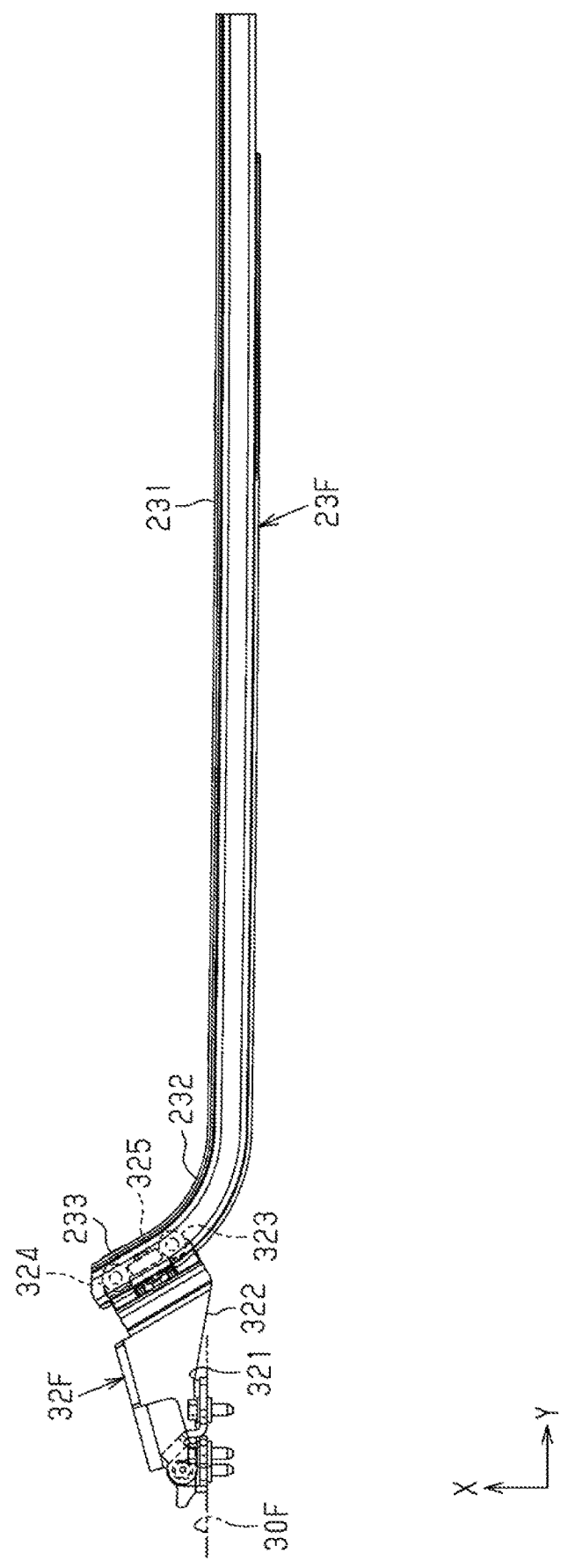
FIG. 17 is a plan view of the center rail and the center hinge unit.
Figure 18:
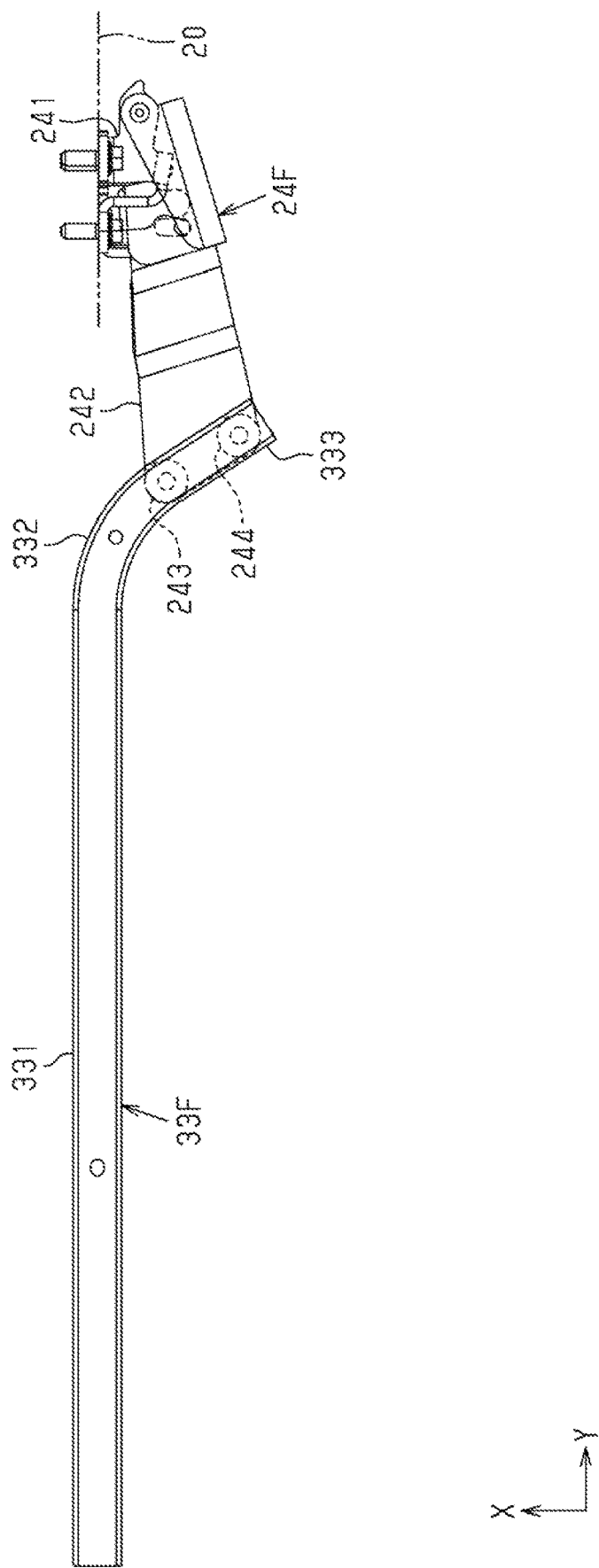
FIG. 18 is a plan view of the lower rail and the lower hinge unit.

In this point, as illustrated in FIGS. 17 and 18, when the first guide roller 323 of the center hinge unit 32F engages with a boundary portion between the second center rail 232 and the third center rail 233, the first guide roller 243 of the lower hinge unit 24F is engaged with a boundary portion between the second lower rail 332 and the third lower rail 333. In this instance, the second guide roller 324 of the center hinge unit 32F engages with the third center rail 233, and the second guide roller 244 of the lower hinge unit 24F is engaged with the third lower rail 333.

Figure 20:
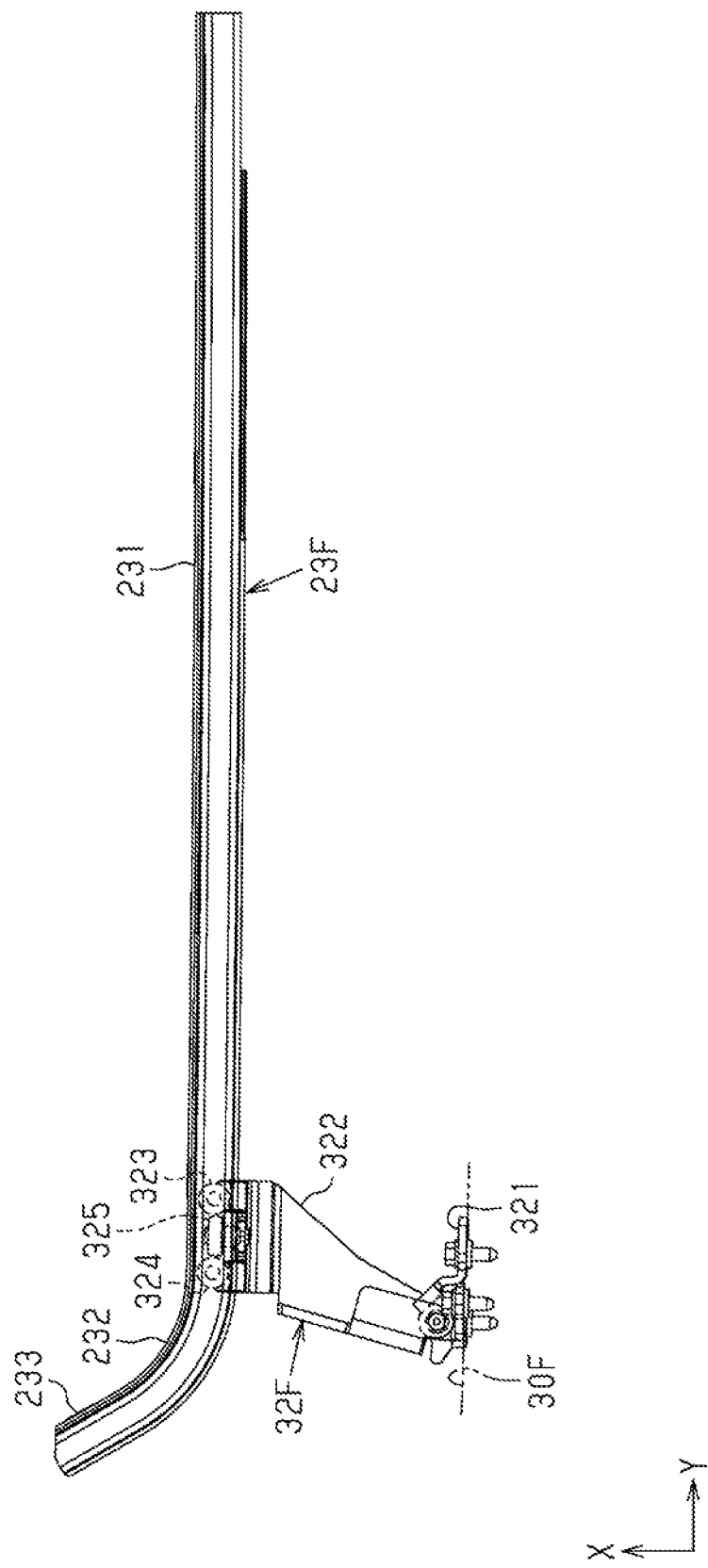
FIG. 20 is a plan view of the center rail and the center hinge unit.
Figure 21:
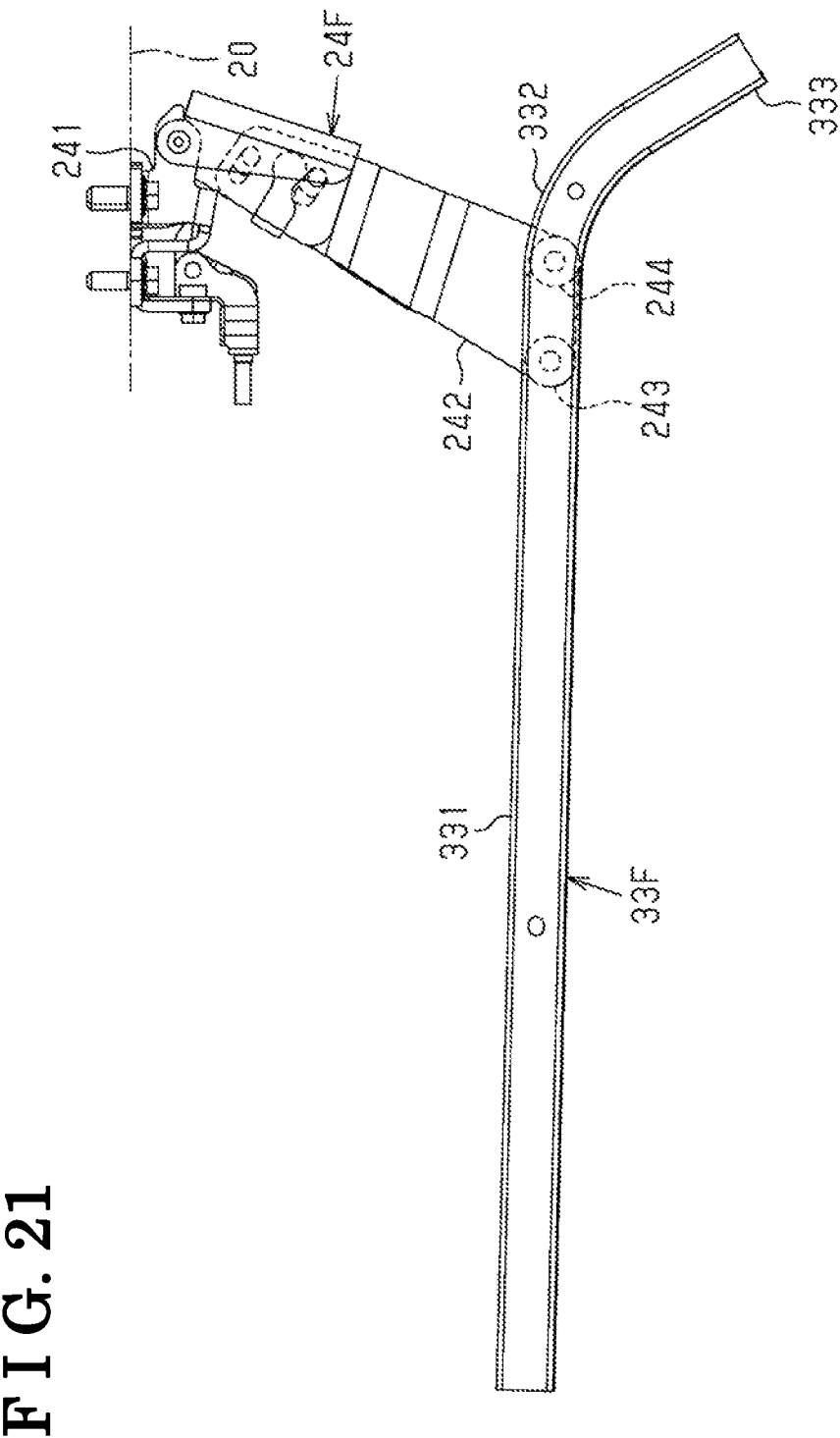
FIG. 21 is a plan view of the lower rail and the lower hinge unit.

Moreover, when the second guide roller 324 of the center hinge unit 32F engages with a boundary portion between the first center rail 231 and the second center rail 232 as illustrated in FIGS. 20 and 21, the second guide roller 244 of the lower hinge unit 24F is engaged with a boundary portion between the first lower rail 331 and the second lower rail 332. In this instance, the first guide roller 323 of the center hinge unit 32F engages with the first center rail 231, and the first guide roller 243 of the lower hinge unit 24F is engaged with the first lower rail 331.

Figure 19:
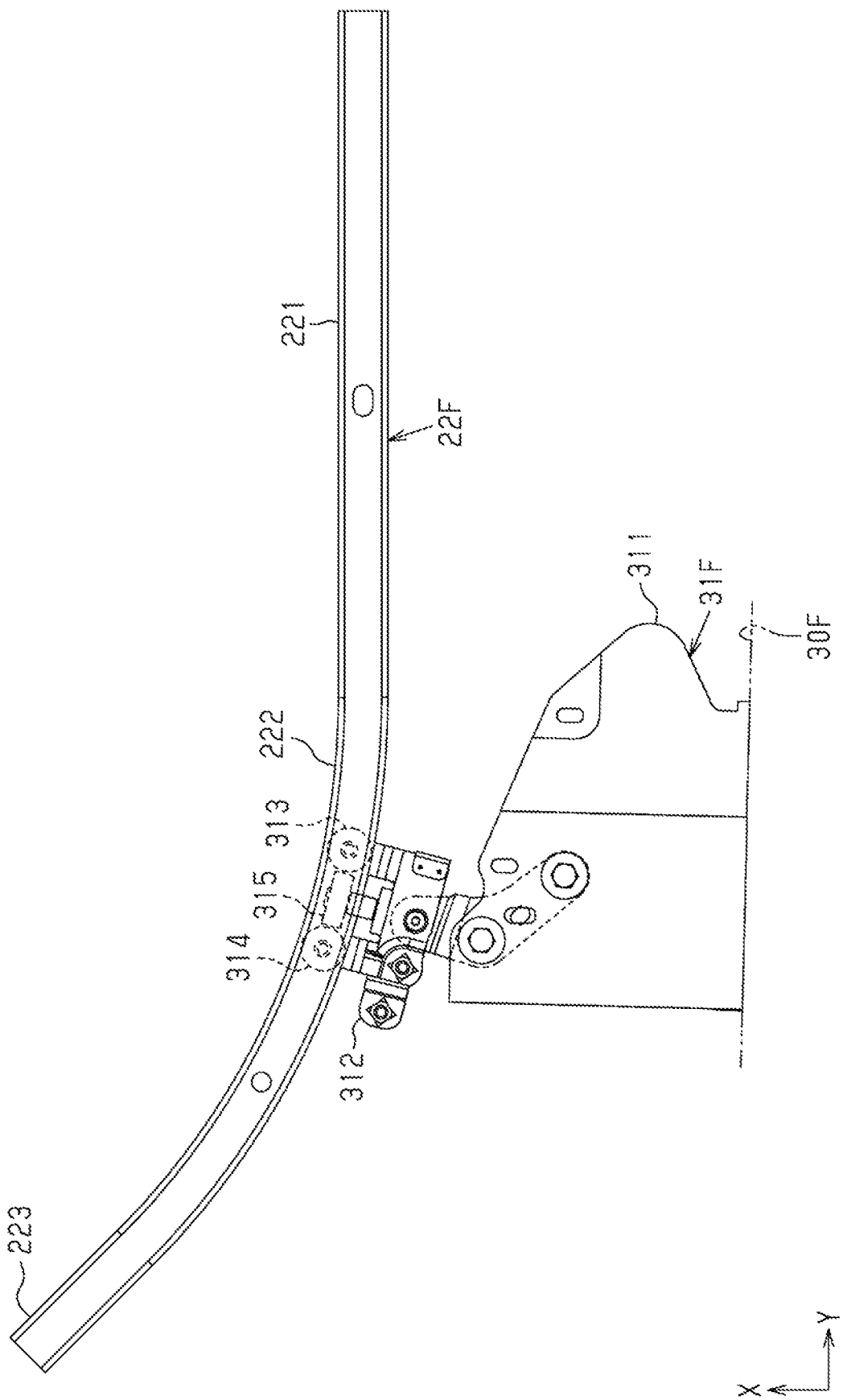
FIG. 19 is a plan view of the upper rail and the upper hinge unit.

Therefore, when the slide door 30F performs an opening-closing operation near a full closed position, a difference is not easily made between lift amounts of the second coupling part C2 and the third coupling part C3 of the slide door 30F. Note that when the second guide roller 324 of the center hinge unit 32F engages with a boundary portion between the third center rail 233 and the second center rail 232 in the slide door support device 100F as illustrated in FIGS. 19 and 20, the second guide roller 244 of the upper hinge unit 31F is engaged with the second lower rail 332.

An advantageous effect of this embodiment is described.

(1) When the slide door 30 performs a closing operation, i.e., when the slide door 30 is located at a full closed position where the door opening 21 is fully closed, the cover 42 does not cover upper sides of the lower strikers 27F and 27R and the exposure hole 411. Thus, the cover device 40 can restrain the cover 42 from blocking operations of the lower lock devices 36F and 36R. On the other hand, when the slide door 30 performs an opening operation, i.e., when the slide door 30 is located at a full opening position where the door opening 21 is fully opened, the cover 42 covers the upper sides of the lower strikers 27F and 27R and the exposure hole 411. Thus, the cover device 40 can restrain the lower strikers 27F and 27R and the exposure hole 411 from affecting getting on and off of a user. Moreover, the cover device 40 can restrain getting on and off of a user from affecting the lower strikers 27F and 27R.

(2) When the first guide roller 243 and the second guide roller 244 of each of the lower hinge units 24F and 24R move along the second lower rail 332, the movable hinge 242 rotates relative to the fixed hinge 241. On the other hand, when the first guide roller 243 and the second guide roller 244 of each of the lower hinge units 24F and 24R move along the first lower rail 331, the movable hinge 242 does not rotate. In other words, the movable hinge 242 rotates at a timing when the slide door 30 performs an opening-closing operation near a full closed position. In this point, the cover device 40 switches whether to transmit power to the cover 42, according to rotation of the movable hinge 242. Thus, the cover device 40 can displace the cover 42 at a timing when a need arises to open or close the cover 42.

(3) When the drive lever 52 pulls the wire 541 via the driven lever 53 at an opening-closing operation of the slide door 30, the cover 42 is displaced to an exposure position. On the other hand, when the drive lever 52 no longer pulls the wire 541 via the driven lever 53 at an opening operation of the slide door 30, the cover 42 is displaced to a covering position according to biasing force of the torsion coil spring 57. In this way, the cover device 40 can displace the cover 42 between a covering position and an exposure position due to an opening-closing operation of the slide door 30.

(4) A user who gets on and off the vehicle 10 easily moves relative to the vehicle 10 in a width direction. Thus, when a direction in which the cover 42 is displaced is a width direction, there is a concern that a user who gets on and off the vehicle 10 steps on the cover 42 located at a covering position, and the cover 42 is thereby displaced from a covering position to an exposure position. In this point, since the cover device 40 displaces the cover 42 between a covering position and an exposure position in a direction intersecting a width direction, a concern that the situation described above arises can be reduced.

(5) For example, when the cover 42 is configured to slide between a covering position and an exposure position, there is a concern that the cover 42 and the protection plate 41 rub against each other. In this point, the cover 42 of the cover device 40 is displaced while swinging between a covering position and an exposure position. Therefore, the cover device 40 can restrain rubbing between the cover 42 and the protection plate 41.

(6) As illustrated in FIG. 2, a length of the second upper rail 222 is longer than the second center rail 232 and the second lower rail 332. Thus, when the slide door 30 performs an opening-closing operation near a full closed position, a lift amount of the first coupling part C1 of the slide door 30 can be made larger as much as a curvature radius of the second upper rail 222 can be made larger. As a result, even when the lower rails 33F and 33R are arranged on the slide door 30 as in this embodiment, tilting of the slide door 30 near a full closed position can be restrained. As a result, an increase of force necessary for an opening-closing operation of the slide door 30 near a full closed position is restrained. For example, an increase of a load of each of the door drive units 25F and 25R is restrained.

(7) When the slide door 30 performs an opening-closing operation near a full closed position, a difference is not easily made between lift amounts of the second coupling part C2 and the third coupling part C3 of the slide door 30. Thus, at an opening-closing operation of the slide door 30, the slide door support device 100 can restrain an increase of force necessary to operate the slide door 30. As a result, there is no longer a need to restrain a size increase of each of the door drive units 25F and 25R, or set a high value for a threshold value for sandwiching of the slide door 30.

(8) At a closing operation of the slide door 30, the slide door support device 100 can restrain tilting of the slide door 30 located near a full closed position. Thus, the slide door support device 100 can restrain a way of collapsing of a weather strip from becoming uneven due to the above-described tilting of the slide door 30.

This embodiment can be modified and implemented as below. This embodiment and the following modified examples can be implemented in combination with each other within a technically consistent scope.

The open-close mechanism 50 may include an actuator that drives the cover 42. In this case, the actuator may operate the cover 42 according to a position of the slide door 30.

The open-close mechanism 50 may operate the cover 42 in conjunction with an opening-closing operation of the slide door 30. For example, the open-close mechanism 50 may include a lever being displaced in a closing direction when the slide door 30 performs a closing operation, while being displaced in an opening direction when the slide door 30 performs an opening operation. In this case, the open-close mechanism 50 may transmit a displacement of the lever in an opening-closing direction to the cover 42.

As long as the open-close mechanism 50 can displace the cover 42 between a covering position and an exposure position due to rotation of the movable hinge 242 of each of the lower hinge units 24F and 24R, a power transmission path between the movable hinge 242 and the cover 42 may be configured in any way. For example, the cable 54 is replaceable with another power transmission member such as a belt or a link.

The open-close mechanism 50 may displace the cover 42 to a covering position by pulling the cable 54 by the driven lever 53, at an opening operation of the slide door 30. On the other hand, the open-close mechanism 50 may displace the cover 42 to an exposure position by pulling the cable 54 by the torsion coil spring 57, at a closing operation of the slide door 30.

The open-close mechanism 50 may displace the cover 42 between a covering position and an exposure position, for example, by linearly moving the cover 42 in a front-rear direction and a width direction. Moreover, the open-close mechanism 50 may displace the cover 42 between a covering position and an exposure position by turning the cover 42 around an axis extending in an up-down direction. In this instance, the open-close mechanism 50 may move the cover 42 along an upper surface of the protection plate 41, or move the cover 42 along a lower surface of the protection plate 41.

In the vehicle 10, the lower strikers 27F and 27R can also be placed in the slide doors 30F and 30R, respectively, and the lower lock devices 36F and 36R can also be placed in the vehicle body 20. In this case, the lower lock devices 36F and 36R are equivalent to a "door lock component".

The lower rails 33F and 33R may be placed in the vehicle body 20. In this case, the lower hinge units 24F and 24R may be placed in the slide doors 30F and 30R, respectively.

The cover device 40 is also applicable to the door opening 21 opening in a rear portion of the vehicle 10. In this case, the cover device 40 may cover, with the cover 42, or expose a door lock component placed in the bottom portion of the door opening 21, according to rotation of a back door.

The vehicle 10 may be a vehicle including a swing-type front door, and a rear door equivalent to the slide door 30R. Namely, the vehicle 10 may not include the double slide doors 30F and 30R.

A technical idea recognized from the embodiment and modified examples described above is described.

A slide door support device is applied to a vehicle including a vehicle body having a door opening in a side portion, and a slide door that opens and closes the door opening. The slide door support device includes a lower rail placed close to a lower end of the slide door and defining a movement direction of the slide door, a lower hinge unit placed close to the lower end and a rear end of the slide door in the vehicle body and engaging with the lower rail, a center rail placed higher than the lower hinge unit in the vehicle body and defining a movement direction of the slide door, and a center hinge unit placed higher and closer to the rear end than the lower rail in the slide door and engaging with the center rail. The lower rail includes a first lower rail linearly extending in an opening direction of the slide door, a second lower rail extending in an arc shape outward in a vehicle width direction as it moves in the opening direction from a tip of the first lower rail in the opening direction, and a third lower rail linearly extending from a tip of the second lower rail. The lower hinge unit includes a fixed hinge fixed to the vehicle body, a movable hinge rotatably supported by the fixed hinge, and two guide rollers rotatably supported by the movable hinge. The center rail includes a first center rail linearly extending in a closing direction of the slide door, a second center rail extending in an arc shape inward in a vehicle width direction as it moves in the closing direction from a tip of the first center rail in a closing direction, and a third center rail linearly extending from a tip of the second center rail. The center hinge unit includes a fixed hinge fixed to the slide door, a movable hinge rotatably supported by the fixed hinge, and two guide rollers rotatably supported by the movable hinge. The two guide rollers of the lower hinge unit engage with the lower rail in a state of being arrayed in a longitudinal direction of the lower rail, and move relative to the lower rail at opening or closing of the slide door. The two guide rollers of the center hinge unit engage with the center rail in a state of being arrayed in a longitudinal direction of the center rail, and move relative to the center rail at opening or closing of the slide door. When one guide roller of the two guide rollers of the lower hinge unit engages with the first lower rail, and the other guide roller engages with a boundary portion between the first lower rail and the second lower rail, one guide roller of the two guide rollers of the center hinge unit engages with the first center rail, and the other guide roller engages with a boundary portion between the first center rail and the second center rail.

Moreover, in the slide door support device, when one guide roller of the two guide rollers of the lower hinge unit engages with the third lower rail, and the other guide roller engages with a boundary portion between the second lower rail and the third lower rail, one guide roller of the two guide rollers of the center hinge unit may engage with the third center rail, and the other guide roller may engage with a boundary portion between the second center rail and the third center rail.

A cover device that solves the problem described above is applied to a vehicle including a vehicle body having a door opening, and a vehicle door that opens and closes the door opening. The vehicle body includes a door lock component that is placed in a bottom portion of the door opening and is coupled to the vehicle door, and thereby binds the vehicle door at a full closed position. The cover device includes a cover and an open-close mechanism. The cover is displaced between a covering position where an upper side of the door lock component is covered, and an exposure position where the door lock component is exposed upward. The open-close mechanism displaces the cover to the covering position when the vehicle door performs an opening operation, and displaces the cover to the exposure position when the vehicle door performs a closing operation.

In the cover device of the configuration described above, when the vehicle door performs a closing operation, i.e., when the vehicle door is located at a full closed position where the door opening is fully closed, the cover does not cover an upper side of the door lock component. Thus, coupling the vehicle door located at a full closed position to the door lock component enables binding of the vehicle door. On the other hand, when the vehicle door performs an opening operation, i.e., when the vehicle door is located at a full opening position where the door opening is fully opened, the cover covers the upper side of the door lock component. Thus, the cover device can restrain getting on and off a vehicle by a user from affecting the door lock component.

The vehicle door may be a slide door that includes a lower rail defining a movement direction of the vehicle door, and that opens and closes the door opening that opens in a side portion of the vehicle body. The vehicle body may include a lower hinge unit that supports the vehicle door via the lower rail. The lower rail may include a first lower rail extending in an opening direction of the vehicle door, and a second lower rail being bent and extending outward in a vehicle width direction as moving in the opening direction from a tip of the first lower rail in the opening direction. The lower hinge unit may include a fixed hinge fixed to the vehicle body, a movable hinge rotatably supported relative to the fixed hinge, and two guide rollers being rotatably supported by the movable hinge and relatively moving along the lower rail. The open-close mechanism may displace the cover due to rotation of the movable hinge when the two guide rollers move along the second lower rail.

In the cover device of the configuration described above, when the guide rollers move along the second lower rail, the movable hinge may rotate relative to the fixed hinge. On the other hand, when the guide rollers move along the first lower rail, the movable hinge may not rotate. In other words, the movable hinge may rotate at a timing when the slide door performs an opening-closing operation near a full closed position. That is to say, the cover device can displace the cover at a timing when a need arises to open or close the cover.

In the cover device described above, the open-close mechanism may include a wire that constitutes a part of a power transmission path between the movable hinge and the cover, and that is pulled due to rotation of the movable hinge when the vehicle door performs an opening operation or a closing operation, and a biasing member that biases the wire in a direction opposite to a pulling direction of the wire due to rotation of the movable hinge.

In the cover device of the configuration described above, when the wire is pulled via the movable hinge at an opening-closing operation of the vehicle door, the cover may be displaced from one of a covering position and an exposure position to another position. On the other hand, when the wire is not pulled via the movable hinge at an opening-closing operation of the vehicle door, the cover may be displaced from the another of the covering position and the exposure position to the one position, according to biasing force of the biasing member. In this way, the cover device can displace the cover between the covering position and the exposure position due to an opening-closing operation of the vehicle door.

In the cover device described above, the cover may be displaced between the covering position and the exposure position by being displaced in a direction intersecting the vehicle width direction.

A user who gets on and off a vehicle easily moves in a width direction relative to the vehicle. Thus, when a direction in which the cover is displaced is the width direction, there is a concern that a user who gets on and off the vehicle steps on the cover located at the covering position, and the cover is thereby displaced from the covering position to the exposure position. In this point, the cover device of the configuration described above can reduce a concern that the situation described above arises.

In the cover device described above, the open-close mechanism may have a four-link mechanism configured by including a drive link that swings due to rotation of the movable hinge, a driven link that swings together with the drive link, and an intermediate link coupled to the drive link and the drive link, and the intermediate link may support the cover.

For example, when the cover is configured to slide between the covering position and the exposure position, there is a concern that a bottom portion of the door opening and the cover rub against each other, and the cover does not operate smoothly. In this point, in the cover device of the configuration described above, the cover is supported by the intermediate link of the four-link mechanism. Thus, the cover can be displaced in such a way as to swing between the covering position and the exposure position. Therefore, the cover device can smoothly operate the cover.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A cover device being applied to a vehicle including a vehicle body having a door opening, and a vehicle door that opens and closes the door opening,
    the vehicle body including a door lock component that is placed in a bottom portion of the door opening and is coupled to the vehicle door, and thereby binds the vehicle door at a full closed position,
    the cover device comprising:
    a cover that is displaced between a covering position where an upper side of the door lock component is covered, and an exposure position where the door lock component is exposed upward; and
    an open-close mechanism that displaces the cover to the covering position when the vehicle door performs an opening operation, and displaces the cover to the exposure position when the vehicle door performs a closing operation, wherein
    the vehicle door is a slide door that includes a lower rail defining a movement direction of the vehicle door, and that opens and closes the door opening that opens in a side portion of the vehicle body,
    the vehicle body includes a lower hinge unit that supports the vehicle door via the lower rail,
    the lower rail includes a first lower rail extending in an opening direction of the vehicle door, and a second lower rail being bent and extending outward in a vehicle width direction as moving in the opening direction from a tip of the first lower rail in the opening direction,
    the lower hinge unit includes a fixed hinge fixed to the vehicle body, a movable hinge rotatably supported relative to the fixed hinge, and two guide rollers being rotatably supported by the movable hinge and relatively moving along the lower rail, and
    the open-close mechanism displaces the cover due to rotation of the movable hinge when the two guide rollers move along the second lower rail.

2. The cover device according to claim 1, wherein the open-close mechanism includes
    a wire that constitutes a part of a power transmission path between the movable hinge and the cover, and that is pulled due to rotation of the movable hinge when the vehicle door performs an opening operation or a closing operation, and
    a biasing member that biases the wire in a direction opposite to a pulling direction of the wire due to rotation of the movable hinge.

3. The cover device according to claim 1, wherein the cover is displaced between the covering position and the exposure position by being displaced in a direction intersecting the vehicle width direction.

4. The cover device according to claim 3, wherein the open-close mechanism has a four-link mechanism configured by including a drive link that swings due to rotation of the movable hinge, a driven link that swings together with the drive link, and an intermediate link coupled to the drive link and the driven link, and
the intermediate link supports the cover.

* * * * *